United States Patent
Yamane et al.

(10) Patent No.: US 12,149,081 B2
(45) Date of Patent: Nov. 19, 2024

(54) REACTIVE POWER SUPPLIER CONTROL DEVICE AND REACTIVE POWER SUPPLIER CONTROL METHOD

(71) Applicant: Mitsubishi Electric Corporation, Tokyo (JP)

(72) Inventors: Keisuke Yamane, Tokyo (JP); Yusuke Takaguchi, Tokyo (JP); Kazuhiro Yasunami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 235 days.

(21) Appl. No.: 17/925,017

(22) PCT Filed: Jun. 23, 2020

(86) PCT No.: PCT/JP2020/024582
§ 371 (c)(1),
(2) Date: Nov. 14, 2022

(87) PCT Pub. No.: WO2021/260788
PCT Pub. Date: Dec. 30, 2021

(65) Prior Publication Data
US 2023/0187938 A1    Jun. 15, 2023

(51) Int. Cl.
*H02J 3/18* (2006.01)
*H02J 3/16* (2006.01)

(52) U.S. Cl.
CPC . *H02J 3/18* (2013.01); *H02J 3/16* (2013.01)

(58) Field of Classification Search
CPC ..................................... H02J 3/16; H02J 3/18
(Continued)

(56) References Cited

U.S. PATENT DOCUMENTS

| | | | | |
|---|---|---|---|---|
| 8,295,988 | B2* | 10/2012 | Yasugi | H02J 3/185 700/287 |
| 2015/0084432 | A1* | 3/2015 | Yamazaki | H02J 3/50 307/112 |
| 2019/0280481 | A1* | 9/2019 | Kuroda | H02J 13/00002 |

FOREIGN PATENT DOCUMENTS

| | | |
|---|---|---|
| JP | 2010-136600 A | 6/2010 |
| JP | 2013-179752 A | 9/2013 |

(Continued)

OTHER PUBLICATIONS

International Search Report and Written Opinion mailed on Aug. 4, 2020, received for PCT Application PCT/JP2020/024582, filed on Jun. 23, 2020, 8 pages including English Translation.

(Continued)

*Primary Examiner* — Yemane Mehari
(74) *Attorney, Agent, or Firm* — XSENSUS LLP

(57) ABSTRACT

Current information is information on a current time step for a power system including a reactive power supplier. A plurality of pieces of future information are a plurality of pieces of information on a plurality of future time steps for the power system. Power installation information is information on installations constituting the power system. An optimal power flow problem is formulated by an objective function and a plurality of constraint expressions based on the current information, the plurality of pieces of future information, and the power installation information. The control command is set based on a variable determined by the optimal power flow. In at least one of the objective function and the plurality of constraint expressions, amounts of variation of an input of the reactive power supplier at the current step and the plurality of future steps of the reactive power supplier are accumulated.

14 Claims, 11 Drawing Sheets

(58) Field of Classification Search
USPC .......................................................... 323/20
See application file for complete search history.

(56) References Cited

FOREIGN PATENT DOCUMENTS

| | | |
|---|---|---|
| JP | 2018-191482 A | 11/2018 |
| JP | 2019-154204 A | 9/2019 |

OTHER PUBLICATIONS

"Example of Analysis Using Developed System Model etc.", Chapter 3, The Power System Standard Model Expansion and Development Research Committee, Developed System Model Report (Manual), The Institute of Electrical Engineers of Japan, Available Online At: http://denki.iee.jp/wp-content/uploads/pes/23-st_model/data/3.1.1_3.1.2a.pdf, Oct. 2001, pp. 37-73 (90 pages including English Translation).

* cited by examiner

FIG. 13

| TIME STEP | REACTIVE POWER Q($T_k$) OF REACTIVE POWER SUPPLIER 107 [p.u.] | |
|---|---|---|
| | MULTI-STEP | SINGLE-STEP |
| $S_0$ | 0.000 | 0.000 |
| $S_1$ | −0.015 | −0.040 |
| $S_2$ | −0.012 | −0.030 |
| $S_3$ | 0.001 | −0.015 |
| $S_4$ | 0.018 | 0.010 |

REACTIVE POWER SUPPLIER CONTROL DEVICE AND REACTIVE POWER SUPPLIER CONTROL METHOD

CROSS-REFERENCE TO RELATED APPLICATION

The present application is based on PCT filing PCT/JP2020/024582, filed Jun. 23, 2020, the entire contents of which are incorporated herein by reference.

TECHNICAL FIELD

The present disclosure relates to a device to control a reactive power supplier (also referred to as a "reactive power supplier control device" in the present disclosure) and a method of controlling the reactive power supplier (also referred to as a "reactive power supplier control method" in the present disclosure).

BACKGROUND ART

A power system includes a reactive power supplier. The reactive power supplier makes a voltage in the power system including the reactive power supplier proper. The reactive power supplier adjusts reactive power when the power system is operated. A plurality of capacitive elements, such as capacitors, and an inductive element, such as a tapped reactor, are used in the reactive power supplier. The capacitive elements and the inductive element are hereinafter generically referred to as "reactance elements".

In adjusting the reactive power in the power system, an input of the reactive power supplier is adjusted. The input of the reactive power supplier is adjusted by switching between connection and insulation between the reactance elements in the reactive power supplier and the power system. The above-mentioned switching is performed many times when the input varies many times. When the switching is performed many times, an element used for the switching, such as a breaker, is likely to be worn away. Wear of the breaker reduces a lifetime of the reactive power supplier.

Due to a recent increase in renewable energy introduced into the power system, variation of a voltage in the power system tends to increase. With the increase in variation, frequency of variation of the input of the reactive power supplier increases. The increase in frequency reduces the lifetime of the reactive power supplier.

A device lifetime of the reactive power supplier is also reduced by aged degradation. The reactive power supplier is replaced when any one of the variation of the input and the number of years of operation of the reactive power supplier becomes equal to or greater than a reference value set thereto.

Patent Document 1 discloses technology of developing a plan for operation of a reactive power supplier from past operation performance and future predicted information of the power system. In the technology disclosed in Patent Document 1, the plan for operation is determined so that, for a predicted value of power demand on the next day, past operation performance of the reactive power supplier on a day having the closest value of the power demand is used as a base plan. The plan for operation is modified as appropriate when the base plan might violate operation constraints.

As the other prior art documents relating to the present disclosure, Patent Documents 2, 3, and 4 and Non-Patent Document 1 are listed below:

PRIOR ART DOCUMENTS

Patent Documents

Patent Document 1: Japanese Patent Application Laid-Open No. 2013-179752
Patent Document 2: Japanese Patent Application Laid-Open No. 2010-136600
Patent Document 3: Japanese Patent Application Laid-Open No. 2019-154204
Patent Document 4: Japanese Patent Application Laid-Open No. 2018-191482

Non-Patent Document

Non-Patent Document 1: The Power System Standard Model Expansion and Development Research Committee, "3. Example of Analysis Using Developed System Model etc.", Developed System Model Report (Manual), The Institute of Electrical Engineers of Japan, October, 2001, [searched on May 7, 2020], Internet URL: http://denki.iee.jp/wp-content/uploads/pes/23-st_model/data/3.1.1_3.1.2a.pdf

SUMMARY

Problem to be Solved by the Invention

In the technology disclosed in Patent Document 1, processing of determining the input of the reactive power supplier at a single time is repeated during a time period for which operation is to be performed (hereinafter referred to as an "operation time period"). With this technology, a total amount of variation of the input of the reactive power supplier over the entire operation time period is not necessarily minimized. The number of times switching between connection and insulation of the reactance elements in the reactive power supplier is performed is thus not necessarily reduced.

It is an object of the present disclosure to provide control to reduce variation of an input of a reactive power supplier.

Means to Solve the Problem

A reactive power supplier control device according to the present disclosure includes an output unit, a storage unit, and a calculation unit. The output unit outputs a control command being a command to control a reactive power supplier included in a power system. The storage unit stores current information, a plurality of pieces of future information, power installation information, an objective function, and a plurality of constraint expressions. The calculation unit performs optimal power flow for an optimal power flow problem.

The current information is information on a current step being a current time step for the power system. The plurality of pieces of future information are a plurality of pieces of information on a plurality of respective future steps being a plurality of future time steps for the power system. The power installation information is information on installations constituting the power system.

The optimal power flow problem is a problem subject to the optimal power flow for the power system. The optimal power flow problem is formulated by the objective function and the plurality of constraint expressions based on the current information, the plurality of pieces of future information, and the power installation information.

The calculation unit performs the optimal power flow to determine a variable for the objective function. The control command is set based on the variable determined by the optimal power flow.

In at least one of the objective function and the plurality of constraint expressions, amounts of variation of an input of the reactive power supplier at the current step and the plurality of future steps of the reactive power supplier are accumulated. Alternatively, when more than one of the reactive power supplier is included in the power system, in at least one of the objective function and the plurality of constraint expressions, variance of a result of accumulated variations of an input of a first one of the reactive power supplier at the current step and the plurality of future steps and a result of accumulated variations of an input of a second one of the reactive power supplier at the current step and the plurality of future steps is used.

Effects of the Invention

According to the present disclosure, control to reduce variation of the input of the reactive power supplier is provided.

The objects, features, aspects, and advantages of the present disclosure will become more apparent from the following detailed description and the accompanying drawings.

BRIEF DESCRIPTION OF DRAWINGS

FIG. 13 shows transition of a value of the reactive power.

DESCRIPTION OF EMBODIMENTS

[Formulation of Optimal Power Flow]

Figure 1:
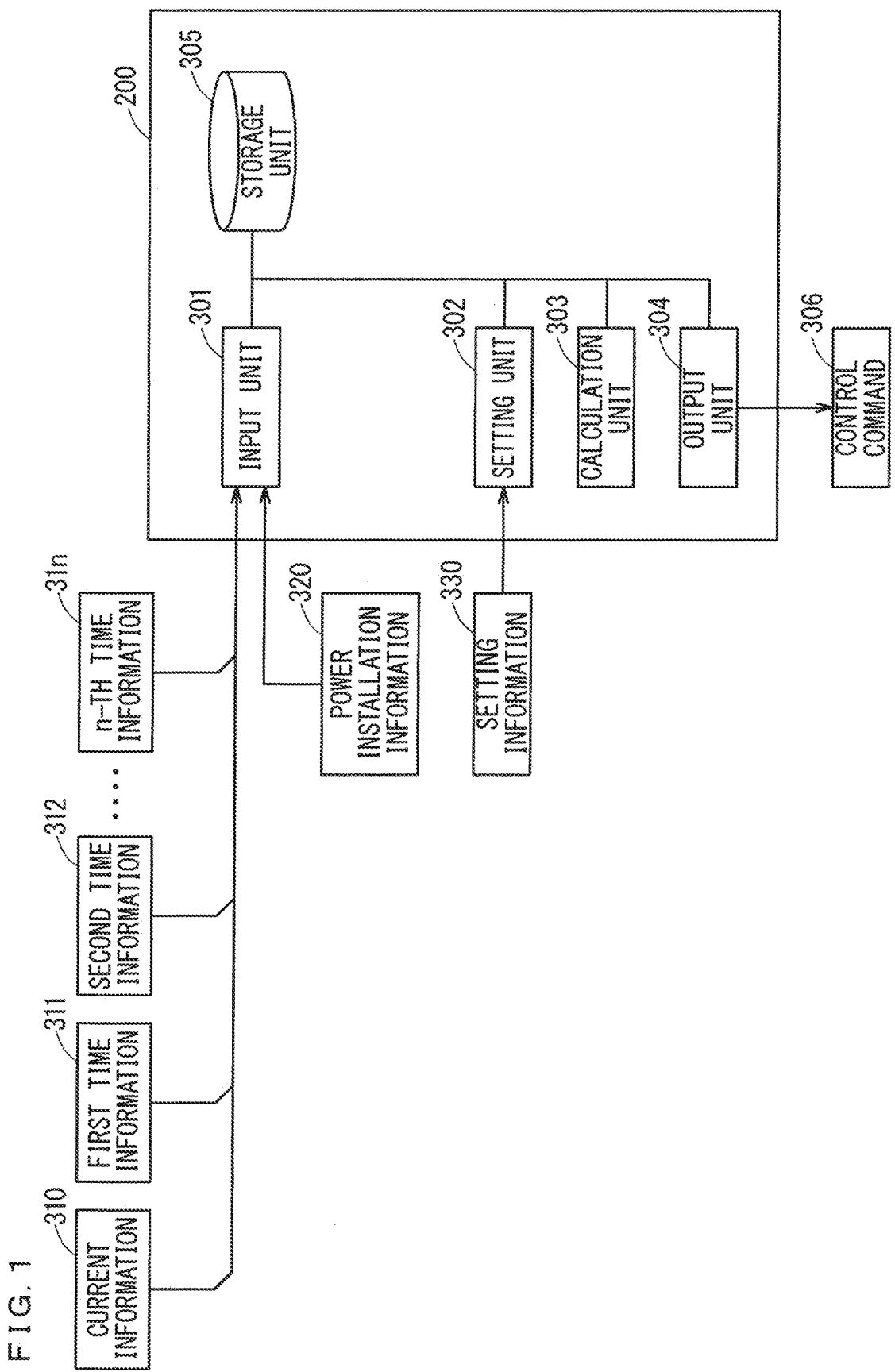
FIG. 1 is a block diagram showing a functional configuration of a control device according to Embodiment 1.

Prior to description of details of embodiments, a method of formulating optimal power flow of a power system will be described.

An objective function of variables x, u, and z represented by an expression (1) is used in optimal power flow. The objective function is singular, for example. The variables x, u, and z to minimize the objective function are determined by the optimal power flow.

$$f(x,u,z) \tag{1}$$

Constraints described below are imposed on the variables x, u, and z, and are formulated by a plurality of constraint expressions. The constraint expressions and the objective function define a problem subject to the optimal power flow (referred to as an "optimal power flow problem" in the present disclosure). The optimal power flow for the optimal power flow problem is performed to determine the variables x, u, and z to minimize the objective function.

Each of the variables x, u, and z represents a plurality of variables (can herein be considered as a set of variables).

The variable x is a voltage solution. The voltage solution is a set of voltage vectors each having a magnitude and a phase angle of a voltage at a bus (a bus voltage) included in a power supply system.

The variable u is a control variable, and is a set of control amounts that can be set to various elements constituting the power system (hereinafter, also referred to as "components of the power system"). Examples of the control variable u include reactive power output from a reactive power supplier, real power output from a generator included in the power system, a terminal voltage at the generator, a tap ratio used by a transformer included in the power system, real power at a load included in the power system, and reactive power at the load.

The variable z is a dependent variable, and is a set of variables dependently determined by setting the control variable u. Examples of the dependent variable z include reactive power output from the generator and a difference in phase angle between buses. The reactive power is determined by setting the real power output from the generator and the terminal voltage at the generator.

Examples of the objective function include a total cost of fuel required to drive the generator (total fuel cost) and a transmission loss. A result (weighted sum) obtained by adding a plurality of objective functions $f_A(x, u, z)$ and $f_B(x, u, z)$ respectively weighted by positive weight factors $K_A$ and $K_B$ as shown in an expression (2) may be treated as a single objective function.

$$K_A \times f_A(x,u,z) + K_B \times f_B(x,u,z) \tag{2}$$

An objective function expressed in another form will be used in the embodiments of the present disclosure as will be described below.

The constraint expressions are expressed, for example, in expressions (3), (4), and (5) as a series of equations and an inequality to be satisfied by the variables x, u, and z.

$$g_A(x,u,z)=0 \tag{3}$$

$$g_B(x,u,z)=0 \tag{4}$$

$$h_A(x,u,z) \leq 0 \tag{5}$$

The equation (3) is a series of state equations, and is referred to as a power flow equation. The equation (4) is a series of equations to be satisfied by a device (e.g., the transformer and the reactive power supplier) included in the power system by constraints on characteristics and stability of the device. The constraints are not limited to the constraints on characteristics and stability of the device. The inequality (5) is a series of inequalities indicating upper and lower limits to be satisfied by the variables x, u, and z (hereinafter referred to as an "upper and lower limit constraint expression".

Any of the objective function and the constraint expressions described above is described by a parameter given by a fixed value in addition to the above-mentioned variables x, u, and z as variable values. Examples of the parameter include a constant of a device included in the power system, line impedance, upper and lower limits of the bus voltage, upper and lower limits of each of the real power and the reactive power output from the generator, and upper and lower limits of an input of the reactive power supplier. Appropriate values are set to these parameters according to states of the components of the power system.

Embodiment 1

[Formulation for Plan for Operation of Reactive Power Supplier]

A method of developing a plan for operation of the reactive power supplier using the above-mentioned optimal power flow will be described. In developing the plan for operation, the optimal power flow is performed at a plurality of future time steps of the power system.

FIG. 1 is a block diagram showing a functional configuration of a control device 200 according to Embodiment 1. The control device 200 functions as a device to control the reactive power supplier. The control device 200 includes an input unit 301, a setting unit 302, a calculation unit 303, an output unit 304, and a storage unit 305.

Current information 310, first time information 311, second time information 312, . . . , and n-th time information 31n (n is a positive integer equal to or greater than two), and power installation information 320 are input into the input unit 301. The first time information 311, second time information 312, . . . , and the n-th time information 31n are each sometimes referred to as future information. An integer k equal to or greater than one and equal to or smaller than n is hereinafter sometimes introduced to represent pieces of future information 311 to 31n by an expression k-th time information 31k.

The current information 310, the k-th time information 31k, and the power installation information 320 input into the input unit 301 correspond to parameters given as fixed values in the objective function and the constraint expressions in the optimal power flow.

Setting information 330 is input into the setting unit 302. The setting information 330 is information on the optimal power flow problem formulated for the plan for operation of the reactive power supplier.

The current information 310, the k-th time information 31k, the power installation information 320, and the setting information 330 are stored in the storage unit 305.

The calculation unit 303 performs the optimal power flow for the optimal power flow problem using the current information 310, the k-th time information 31k, and the power installation information 320 stored in the storage unit 305 as the parameters.

An optimal solution of a constrained nonlinear programming problem is determined by the optimal power flow. The optimal power flow is performed using an interior point method, for example. The calculation unit 303 performs the optimal power flow using a general-purpose nonlinear programming problem calculation program, for example.

Optimal values of the variables x, u, and z determined by the optimal power flow are stored in the storage unit 305. The optimal value of the control variable u includes a result of calculation of the reactive power of the reactive power supplier at each time step. Results of calculation of the reactive power of the reactive power supplier over a plurality of time steps during an operation time period are arranged in time order to be the plan for operation of the reactive power supplier. The reactive power supplier is controlled based on the plan for operation. The plan for operation is stored in the storage unit 305, for example.

The output unit 304 outputs a control command 306. The control command 306 functions as a command to control the reactive power supplier to be controlled by the control device 200. The control command 306 may be determined by the calculation unit 303, or may be determined by the output unit 304.

Figure 2:
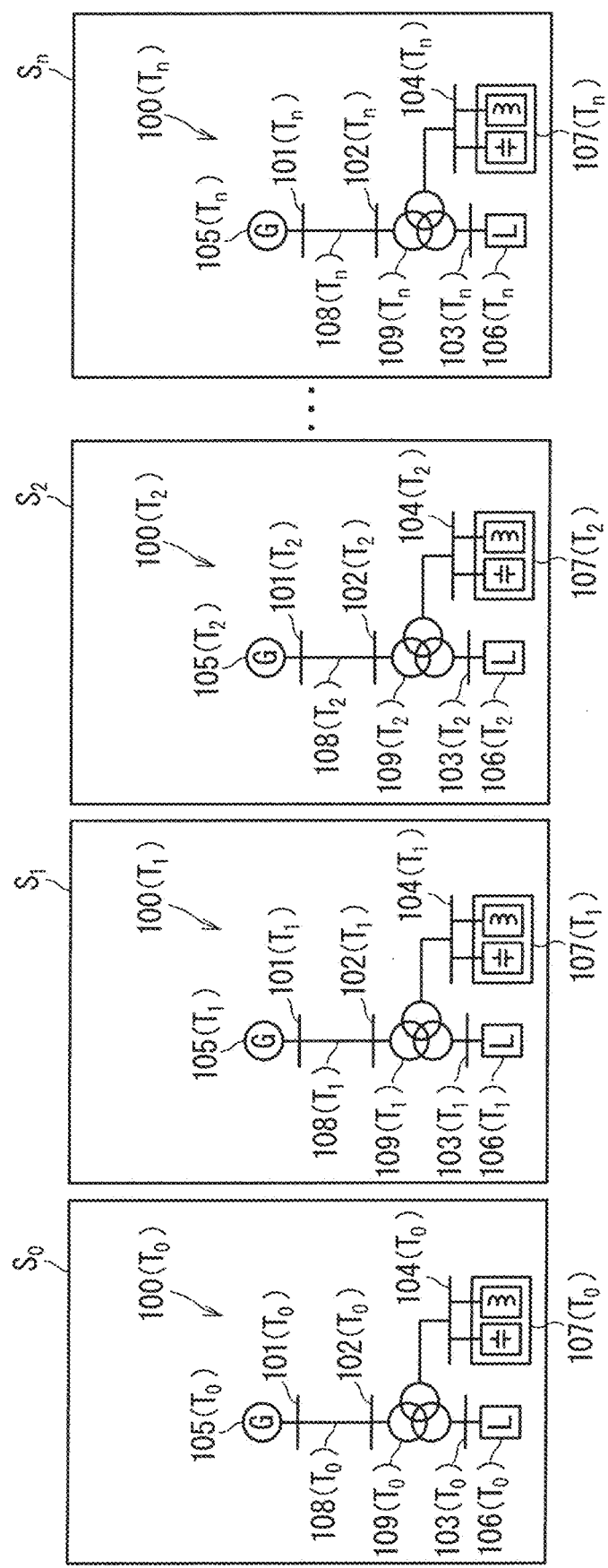
FIG. 2 is a conceptual diagram showing a time series of a plurality of time steps in Embodiment 1.

FIG. 2 is a conceptual diagram showing a time series of a plurality of time steps $S_0, S_1, S_2, \ldots S_n$ for a power system 100 including a reactive power supplier 107 to be controlled by the control device 200 in Embodiment 1.

The time step $S_0$ is a current time step of the power system 100, and is hereinafter also referred to as a current step $S_0$ or a 0-th step $S_0$. The time steps $S_1, S_2, \ldots S_n$ are future time steps of the power system 100, and are hereinafter also expressed as future steps. The above-mentioned integer k is hereinafter sometimes introduced to use a k-th step $S_k$ representing the future steps $S_1, S_2, \ldots S_n$.

Description will be made on a case where the power system 100 includes the same components from the present to the future in Embodiment 1 for simplicity. A case where the power system 100 includes buses 101, 102, 103, and 104, a generator 105, a load 106, the reactive power supplier 107, a transmission line 108, and a transformer 109 will be described in Embodiment 1.

The generator 105 is connected to the bus 101. The bus 101 and the bus 102 are connected via the transmission line 108. The load 106 is connected to the bus 103. The reactive power supplier 107 is connected to the bus 104. The buses 102, 103, and 104 are connected via the transformer 109.

In FIG. 2, "$(T_0)$" has been added to the end of a reference sign of each of the power system 100, the buses 101, 102, 103, and 104, the generator 105, the load 106, the reactive power supplier 107, the transmission line 108, and the transformer 109 at the 0-th step $S_0$ to indicate a state thereof at a current time (hereinafter also referred to as a "0-th time") $T_0$.

Similarly, "$(T_k)$" has been added to the end of the reference sign of each of the power system 100, the buses 101, 102, 103, and 104, the generator 105, the load 106, the reactive power supplier 107, the transmission line 108, and the transformer 109 at the k-th step $S_k$ to indicate a state thereof at a future k-th time $T_k$. The k-th time $T_k$ is later than a (k−1)-th time $T_{k-1}$. The k-th step $S_k$ is a future step later than a (k−1)-th step $S_{k-1}$.

Figure 3:
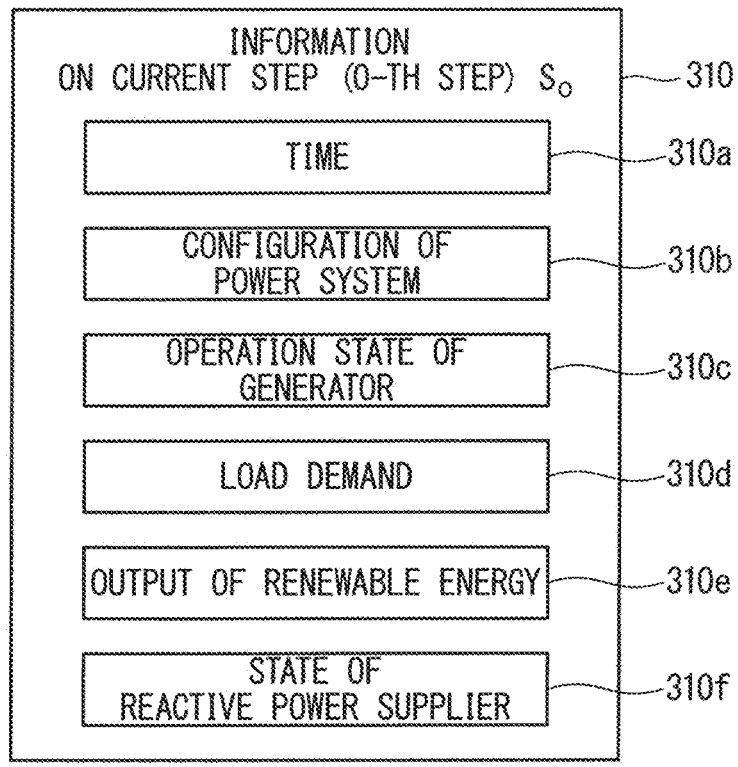
FIG. 3 is a block diagram showing content of current information in Embodiment 1.

FIG. 3 is a block diagram showing content of the current information 310 in Embodiment 1. The current information 310 is information on the current step (0-th step) $S_0$. The current information 310 includes pieces of information 310a, 310b, 310c, 310d, 310e, and 310f.

The information 310a indicates a time corresponding to the current step $S_0$ (specifically, the 0-th time $T_0$ as the current time). The information 310b indicates a current configuration of the power system 100 (specifically, the buses $101(T_0)$, $102(T_0)$, $103(T_0)$, and $104(T_0)$, the generator $105(T_0)$, the load $106(T_0)$, the reactive power supplier $107(T_0)$, the transmission line $108(T_0)$, and the transformer 109($T_0$) of the power system 100($T_0$) and a connection relationship among them (including the connection relationship itself or an estimated connection relationship)).

The information 310c indicates a current operation state of the generator 105 (specifically, an operation state of the generator 105($T_0$) (including the operation state itself or an estimated operation state)).

The information 310d indicates a current value of an amount of power demand at the load 106 (load demand) (specifically, a load demand at the load 106($T_0$) or an estimated value thereof).

The information 310e indicates a current output of renewable energy (specifically, an output of renewable energy of the generator 105($T_0$) or an estimated value thereof).

The information 310f indicates a current state of the reactive power supplier 107 (specifically, an input of the reactive power supplier 107($T_0$) itself or an estimated value thereof, or reactive power output from the reactive power supplier 107($T_0$) itself or an estimated value thereof).

Figure 4:
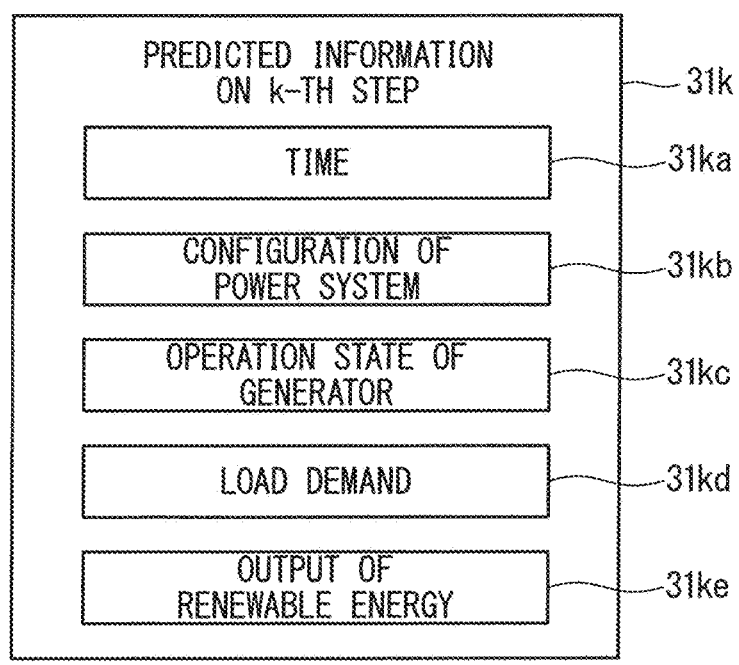
FIG. 4 is a block diagram showing content of future information.

FIG. 4 is a block diagram showing content of the pieces of future information 311 to 31n in Embodiment 1 as the k-th time information 31k. The k-th time information 31k is information predicted (predicted information) on the k-th step $S_k$. The k-th time information 31k includes pieces of information 31ka, 31kb, 31kc, 31kd, and 31ke, and 31kf (k=1 to n).

The information 31ka indicates the k-th time $T_k$. The information 31kb indicates a configuration of the power system 100 at the k-th time $T_k$ (specifically, the buses 101($T_k$), 102($T_k$), 103($T_k$), and 104($T_k$), the generator 105 ($T_k$), the load 106($T_k$), the reactive power supplier 107($T_k$), the transmission line 108($T_k$), and the transformer 109($T_k$) of the power system 100($T_k$) and a connection relationship among them).

The information 31kc indicates a schedule for the operation state of the generator 105 at the k-th time $T_k$ (an operation plan: specifically, a plan for operation of the generator 105($T_k$)).

The information $31_{kd}$ indicates a predicted value of the load demand at the k-th time $T_k$ (specifically, a predicted value of the load demand at the load 106($T_k$)).

The information 31ke indicates a schedule for an output of renewable energy at the k-th time $T_k$ (specifically, an operation plan or a predicted value of the output of renewable energy of the generator 105($T_k$)).

Figure 5:
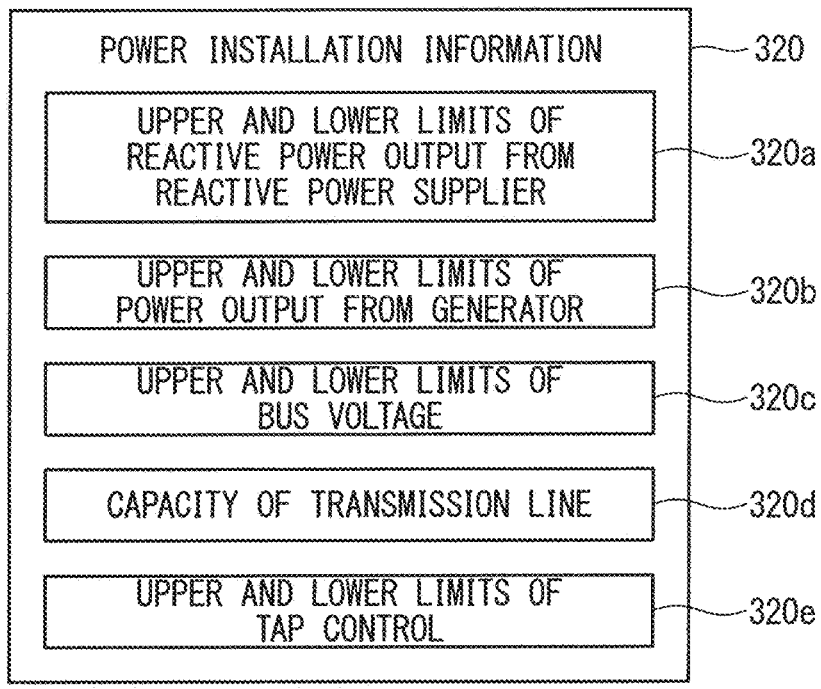
FIG. 5 is a block diagram showing content of power installation information.

FIG. 5 is a block diagram showing content of the power installation information 320. The power installation information 320 includes information on installations constituting the power system. The power installation information 320 includes pieces of information 320a, 320b, 320c, 320d, and 320e.

The information 320a indicates upper and lower limits of reactive power output from the reactive power supplier 107. The information 320b indicates upper and lower limits of power output from the generator 105. The information 320c indicates upper and lower limits of the bus voltage at the buses 101 to 104. The information 320d indicates a capacity of the transmission line 108. The information 320e indicates upper and lower limits of tap control of the transformer 109.

Figure 6:
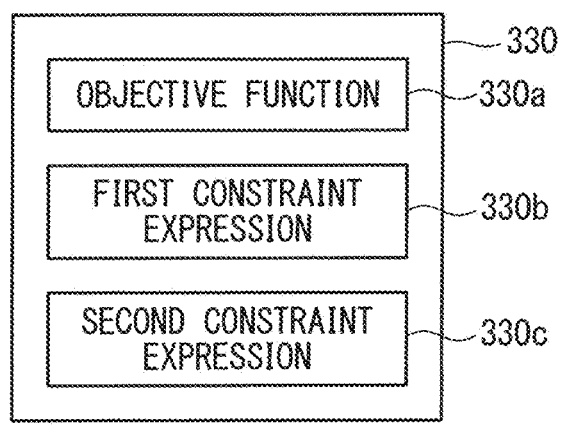
FIG. 6 is a block diagram showing content of setting information.

FIG. 6 is a block diagram showing content of the setting information 330. The setting information 330 includes information 330a on the objective function, information 330b on a first constraint expression, and information 330c on a second constraint expression.

[Example in Case of Two Future Steps]

A case where two future steps $S_1$ and $S_2$ are considered will be described as an example. An objective function f is represented by an expression (6) similar to the expression (1).

$$f(x_1,u_1,z_1;x_2,u_2,z_2) \tag{6}$$

Alternatively, the objective function f is represented by an expression (7) similar to the expression (2).

$$K_{A1} \times f_{A1}(x_1,u_1,z_1) + K_{B1} \times f_{b1}(x_1,u_1,z_1) + K_{A2} \times f_{A2}(x_2,u_2,z_2) + K_{B2} \times f_{B2}(x_2,u_2,z_2) \tag{7}$$

A weight factor $K_{A1}$ and a weight factor $K_{A2}$ are not necessarily required to have the same value, and a weight factor $K_{B1}$ and a weight factor $K_{B2}$ are not necessarily required to have the same value. When a first step $S_1$ is weighed more than a second step $S_2$, for example, the weight factor $K_{A1}$ is set to have a greater value than the weight factor $K_{A2}$, and the weight factor $K_{B1}$ is set to have a greater value than the weight factor $K_{B2}$.

The first constraint expression defined by the information 330b includes a power flow equation and a constraint expression at each future step. The first constraint expression is expressed using the equations and the inequality (3) to (5), for example. A form expressed by the equations and the inequality (3) to (5) is commonly used at each time step.

A power flow equation at the first step $S_1$ is expressed by an equation (8A) similar to the equation (3) using variables $x_1$, $u_1$, and $z_1$ as the variables x, u, and z at a first time $T_1$. Similarly, an equation corresponding to the equation (4) is expressed by an equation (9A), and an upper and lower limit constraint expression is expressed by an inequality (10A) similar to the inequality (5). Subscripts 1 added to symbols $g_A$, $g_B$, and $h_A$ representing functions on the left-hand side indicate that these expressions are constraint expressions at the first time $T_1$.

$$g_{A1}(x_1,u_1,z_1)=0 \tag{8A}$$

$$g_{B1}(x_1,u_1,z_1)=0 \tag{9A}$$

$$h_{A1}(x_1,u_1,z_1) \le 0 \tag{10A}$$

Similarly, a power flow equation at the second step $S_2$ is expressed by an equation (8B) similar to the equation (3), an equation corresponding to the equation (4) is expressed by an equation (9B), and an upper and lower limit constraint expression is expressed by an inequality (10B) similar to the inequality (5). Subscripts 2 added to the symbols $g_A$, $g_B$, and $h_A$ representing the functions on the left-hand side indicate that these expressions are constraint expressions at a second time $T_2$.

$$g_{A2}(x_2,u_2,z_2)=0 \tag{8B}$$

$$g_{B2}(x_2,u_2,z_2)=0 \tag{9B}$$

$$h_{A2}(x_2,u_2,z_2) \le 0 \tag{10B}$$

A specific example of the first constraint expression includes the power flow equations at each time step (the equations (8A) and (8B)), upper and lower limits of the real power and the reactive power output from the generator 105, a constraint on a capacity of the reactive power supplier 107, upper and lower limits of the bus voltage at the buses 101 to 104, a constraint on the tap control of the transformer 109, and equations indicating constraints on capacities of the transmission line 108 and the transformer 109 (see the equations (9A) and (9B)) or the upper and lower limit constraint expressions (see the inequalities (10A) and (10B)). These constraints and upper and lower limits are treated as parameters in the equations or the inequalities of the first constraint expression to formulate the optimal power flow problem.

The second constraint expression defined by the information 330c defines constraints over a plurality of future steps. In the second constraint expression, a relationship between at least one or more variables at the first step $S_1$ and variables at the second step $S_2$ corresponding thereto is defined. The second constraint expression includes an equation using a function $g_C$ shown in an equation (11) and an inequality (upper and lower limit constraint expression) using a function $h_B$ shown in an equation (12).

$$g_C(x_1,u_1,z_1;x_2,u_2,z_2)=0 \quad (11)$$

$$h_B(x_1,u_1,z_1;x_2,u_2,z_2)\leq 0 \quad (12)$$

The objective function, the first constraint expression, and the second constraint expression define constraints imposed on operation of the power system 100. In Embodiment 1, at least one of the objective function and the second constraint expression is set to reduce the total amount of variation of the input of the reactive power supplier 107. The optimal power flow is formulated to include at least one of the objective function and the second constraint expression to reduce the total amount.

From among variables $x_k$, $u_k$, and $z_k$ to be optimal solutions determined by solving the optimal power flow problem, the control variable $u_k$ includes the reactive power output from the reactive power supplier 107($T_k$) at the k-th step $S_k$(k=1, 2).

Results of calculation of the reactive power output from the reactive power supplier 107 over the plurality of time steps during the operation time period are arranged in time order to be the plan for operation of the reactive power supplier 107. The reactive power supplier 107 is controlled based on the plan for operation.

[Specific Example of Objective Function]

The objective function is expressed by an equation (13) to minimize the total amount of variation of the input of the reactive power supplier 107 (hereinafter, also referred to as a "reactive power supplier variation amount") from the current step $S_0$ to the second step $S_2$, for example.

$$f(u_1;u_2)=(Q(T_2)-Q(T_1))^2+(Q(T_1)-Q(T_0))^2 \quad (13)$$

Reactive power $Q(T_j)$ (j=0, 1, 2) output from the reactive power supplier 107($T_j$) at a j-th step $S_j$ is introduced in the equation (13). Reactive power $Q(T_0)$ is a parameter included in the information 310f as a fixed value, for example. Reactive power $Q(T_1)$ is used as a control variable $u_1$, and reactive power $Q(T_2)$ is used as a control variable $u_2$. The control variables $u_1$ and $u_2$ to minimize the objective function while meeting the first constraint expression and the second constraint expression are determined by the optimal power flow.

The amount of variation of the reactive power Q (hereinafter also referred to as a "reactive power variation amount") output from the reactive power supplier 107 reflects the reactive power supplier variation amount of the reactive power supplier 107. From this perspective, it can be said that reactive power supplier variation amounts of the reactive power supplier 107 are accumulated in the objective function.

Similarly to the expression (7), a weighted sum of the objective function shown in the equation (13) and another objective function can be set as the objective function. Other specific examples of the other objective function include the total fuel cost of the generator 105, a loss (the transmission loss) of the transmission line 108, and deviations of the bus voltage at the buses 101 to 104 from target values. Alternatively, the above-mentioned objective function may be set to maximize a transmission margin of the transmission line 108.

For example, a condition to reduce a total amount of the reactive power variation amount of the reactive power supplier 107 is set as the second constraint expression. Specifically, the equation (11) is expressed by an equation (14A). The equation (14A) indicates a constraint that the reactive power Q output from the reactive power supplier 107 does not vary depending on a difference between the first time $T_1$ and the second time $T_2$.

$$g_C(u_1;u_2)=Q(T_2)-Q(T_1) \quad (14A)$$

For example, an inequality expressed by an inequality (14B) by using an upper limit $\Delta Q_{max}$ as a total sum of the reactive power variation amount of the reactive power supplier 107 from the current step $S_0$ to the second step $S_2$ is used as the second constraint expression.

$$h_B(u_1;u_2)=|Q(T_2)-Q(T_1)|+|Q(T_1)-Q(T_0)|-\Delta Q_{max}\leq 0 \quad (14B)$$

The condition to reduce the total amount of the reactive power variation amount of the reactive power supplier 107 is not necessarily required to be set as the second constraint expression when the reactive power variation amount is included in the objective function as shown in the equation (13), and the control variable $u_k$ to minimize the objective function is determined by the optimal power flow.

In such a case, a constraint on a speed of variation of the real power output from the generator 105 and a constraint on upper and lower limits of the amount of variation of the bus voltage at the buses 101 to 104 may be used as the second constraint expression, for example.

The reactive power variation amount is not necessarily required to be included in the objective function when the reactive power variation amount is included in the second constraint expression, and the optimal power flow is performed while the total sum of the amount thereof is constrained as shown in the equation (14A) or in the inequality (14B). In such a case, the weighted sum of one or more of the total fuel cost of the generator 105, the transmission loss, and the deviations of the bus voltage at the buses 101 to 104 from the target values may be used as the objective function, and the control variable $u_k$ to provide a minimum value thereof may be determined, for example. Alternatively, the transmission margin of the transmission line 108 may be used as the objective function, and the control variable $u_k$ to provide a maximum value thereof may be determined.

[Expansion of Number of Future Steps]

A case where n future steps $S_1$ to $S_n$ are considered will be shown next. The information 330a defines a single objective function f([x], [u], [z]). A symbol [x] indicates a set of values of the variable x (specifically, voltage solutions) at times of day corresponding to different time steps. Keeping with the above-mentioned example, the variable x at the k-th time $T_k$ is expressed as the variable $x_k$, and the symbol [x] indicates a set of variables $x_1$ to $x_n$. Similarly, the control variable u at the k-th time $T_k$ is expressed as the control variable $u_k$, and a symbol [u] indicates a set of control variables $u_1$ to $u_n$. Similarly, the variable z at the k-th time $T_k$ is expressed as the variable $z_k$, and a symbol [z] indicates a set of variables $z_1$ to $z_n$.

The objective function is shown in an expression (15) by setting a single function common to the n future steps $S_1$ to $S_n$. As for the constraint condition, the first constraint expression is expressed by equations (16) and (17) and an inequality (18), and the second constraint expression is expressed by an equation (19) and an inequality (20).

$$f([x],[u],[z]) \quad (15)$$

$$g_{Ak}(x_k,u_k,z_k)=0 \quad (16)$$

$$g_{Bk}(x_k,u_k,z_k)=0 \quad (17)$$

$$h_{Ak}(x_k,u_k,z_k)\leq 0 \quad (18)$$

$$g_C([x],[u],[z])=0 \quad (19)$$

$$h_B([x],[u],[z])\leq 0 \quad (20)$$

As in an example shown for the two future steps $S_1$ and $S_2$, at least one equation to reduce the total amount of the reactive power variation amount of the reactive power supplier 107 is set as one or both of the objective function and the second constraint expression.

For example, an equation (21) obtained by expanding the equation (13) as the objective function is used when the reactive power variation amount of the reactive power supplier 107 is reduced using the objective function. A symbol $\Sigma$ indicates the sum of 1 to n for the integer k.

$$f([u])=\Sigma(Q(T_k)-Q(T_{k-1}))^2 \quad (21)$$

For example, one or both of an equation (22A) and an inequality (22B) is/are used when the reactive power variation amount of the reactive power supplier 107 is reduced using the second constraint expression. The equation (22A) is obtained by expanding the equation (14A). The inequality (22B) is obtained by expanding the inequality (14B).

$$g_{Ck}([u])=Q(T_k)-Q(T_{k-1})=0 \quad (22A)$$

$$h_B([u])=\Sigma(|Q(T_k)-Q(T_{k-1})|)-\Delta Q_{max}\leq 0 \quad (22B)$$

A function $g_{Ck}$ used in the equation (22A) is set based on the reactive power Q as the variable common to future steps $S_{k-1}$ and $S_k$ for each future step $S_k$. In the inequality (22B), the symbol $\Sigma$ indicates the sum of 1 to n for the integer k. The upper limit $\Delta Q_{max}$ refers to an upper limit of the sum of the reactive power variation amount of the reactive power supplier 107, and is set to a positive value or zero.

Accuracy of prediction of a state of the power system 100($T_k$) at the future step $S_k$ can be considered in one or both of the objective function and the constraint expressions. It is typically assumed that accuracy of prediction is degraded more as a future time step is farther from the current time.

For example, the optimal power flow is formulated so that a future step closer to the current time is weighed more. For example, the reactive power variation amount of the reactive power supplier 107 is calculated for each of intervals between time steps. Reactive power variation amounts are each positively weighted, and the positively weighted reactive power variation amounts are added to set the objective function.

The objective function is expressed by an equation (23) specifically by introducing a weight factor $K_k(>0)$ for the reactive power $Q(T_k)$ at the k-th step $S_k$ into the equation (21). In terms of accuracy of prediction, an inequality $K_k \geq K_{k+1}$ holds for each integer k. The weight factor $K_k$ is set to be smaller as the future step $S_k$ corresponding to the weight factor $K_k$ is farther from the current step $S_0$. The optimal power flow reflecting accuracy of prediction is performed by using the objective function in which such a weight factor $K_k$ is used.

$$f([u])=\Sigma(K_k \times (Q(T_k)-Q(T_{k-1}))^2) \quad (23)$$

The second constraint expression expressed by an inequality (24) by introducing the weight factor $K_k$ (>0) into the inequality (22B) is used, for example. Also in the inequality (24), the symbol $\Sigma$ indicates the sum of 1 to n for the integer k.

$$h_B([u])=\Sigma(K_k \times |Q(T_{k-1})|)-\Delta Q_{max}\leq 0 \quad (24)$$

For example, the reactive power variation amount at the future steps $S_1$ to $S_n$ may not be considered. In this case, when an inequality k≥i holds, an equation $K_k=0$ is set as an exception of an inequality $K_k>0$.

The objective function, the first constraint expression, and the second constraint expression are set to formulate the optimal power flow. In Embodiment 1, at least one equation to reduce the total amount of the reactive power variation amount of the reactive power supplier 107 is set in one or both of the objective function and the second constraint expression. In Embodiment 1, formulation to suppress the amount of variation of the input of the reactive power supplier 107 is performed in at least one of the objective function and the constraint expression. In Embodiment 1, in at least one of the objective function and the second constraint expression, the reactive power supplier variation amounts of the reactive power supplier 107 at the current step $S_0$ and the future steps $S_1$ to $S_n$ of the reactive power supplier 107 are accumulated.

The plan for operation of the reactive power supplier 107 is set based on the optimal solutions of the variables x, u, and z determined by the optimal power flow. The plan for operation suppresses variation of the input of the reactive power supplier 107 while meeting the constraints imposed on the power system 100. Suppression of variation of the input of the reactive power supplier 107 mitigates shortening of a lifetime of the reactive power supplier 107. The plan for operation is set by the calculation unit 303, for example.

The control device 200, more specifically, the output unit 304 outputs the control command 306 based on the plan for operation to the reactive power supplier 107. The control command 306 may be created by the calculation unit 303. Alternatively, the output unit 304 may acquire the plan for operation of the reactive power supplier 107 from the calculation unit 303 or the storage unit 305, and create the control command 306. The control device 200 may output the power output from the generator 105 and the terminal voltage of the generator 105, for example, as a result of the optimal power flow of a control device corresponding to the variables x, u, and z.

The plan for operation is set and the control command 306 is created for each calculation period while information on the current step $S_0$ and the future step $S_k$ is updated. The plan for operation is updated for each calculation period. The control command 306 is created based on the updated plan for operation, and is output to the reactive power supplier 107. The calculation period is set to any period, for example. The calculation period may be changed during operation of the control device 200.

[Configuration and Operation of Reactive Power Supplier Control Device]

Figure 7:
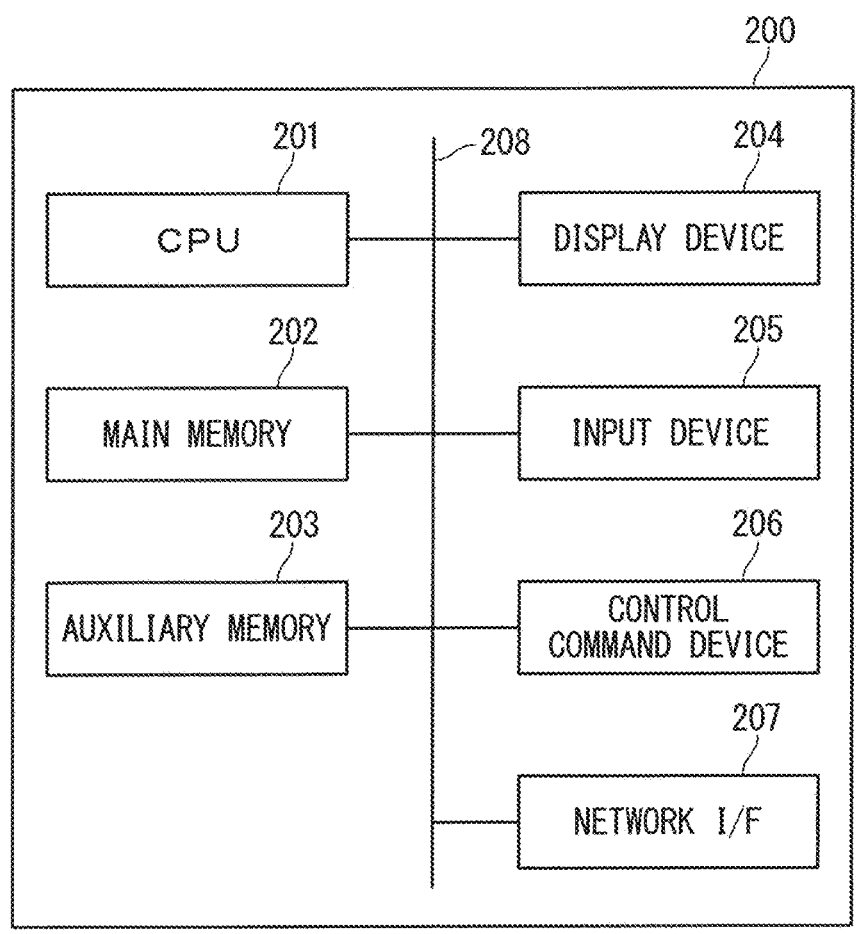
FIG. 7 is a block diagram showing a hardware configuration of the control device.

FIG. 7 is a block diagram showing a hardware configuration of the control device 200. The control device 200 is configured based on a computer. The control device 200 includes a central processing unit (CPU) 201, main memory 202, auxiliary memory 203, a display device 204, an input device 205, a control command device 206, and a network interface (hereinafter and in FIG. 7 referred to as a "network I/F") 207. These components are interconnected via a bus 208.

Examples of the main memory 202 include random access memory (RAM) and read only memory (ROM). Examples of the auxiliary memory 203 include a hard disk device, an optical disc device, and universal serial bus (USB) memory. An example of the display device 204 includes a liquid crystal display. Examples of the input device 205 include a keyboard and a mouse.

The input device 205 receives the current information 310, the pieces of future information 311 to 31n, and the power installation information 320 shown in FIG. 1, for example. The input device 205 achieves the input unit 301 and the setting unit 302 shown in FIG. 1.

The current information 310, the pieces of future information 311 to 31n, and the power installation information 320 may be stored in the auxiliary memory 203 from outside the control device 200. In this case, the auxiliary memory 203 achieves the input unit 301 and the setting unit 302 shown in FIG. 1. In this case, the input device 205 and the setting unit 302 may be omitted.

The current information 310, the pieces of future information 311 to 31n, and the power installation information 320 may be input into the control device 200 via the network I/F 207. In this case, the network I/F 207 achieves the input unit 301 and the setting unit 302 shown in FIG. 1. In this case, the input device 205 and the setting unit 302 may be omitted.

Alternatively, the current information 310, the pieces of future information 311 to 31n, and the power installation information 320 may separately be input into the control device 200 via the input device 205, the auxiliary memory 203, and the network I/F 207.

For example, the function of the storage unit 305 shown in FIG. 1 is achieved by one or both of the main memory 202 and the auxiliary memory 203. The CPU 201 achieves the function of the calculation unit 303 shown in FIG. 1. The control command device 206 outputs the control command 306 shown in FIG. 1.

When the calculation unit 303 creates the control command 306, the control command device 206 achieves the function of the output unit 304 as a mere output device. Alternatively, the calculation unit 303 may create the control command 306, and the auxiliary memory 203 or the network I/F 207 may output the control command 306. In this case, the control command device 206 may be omitted.

When the output unit 304 creates the control command 306, the CPU 201 achieves the function of creating the control command 306 of the output unit 304 shown in FIG. 1. In this case, the control command device 206 achieves the function of outputting the control command 306 of the output unit 304. Alternatively, the CPU 201 may create the control command 306, and the auxiliary memory 203 or the network I/F 207 may output the control command 306. In this case, the control command device 206 may be omitted.

One or more of the auxiliary memory 203, the display device 204, and the network I/F 207 may output the result of the optimal power flow of the control device corresponding to the variables x, u, and z. One or more of the auxiliary memory 203, the display device 204, and the network I/F 207 may output the plan for operation of the reactive power supplier 107. From this perspective, it can be said that one or more of the auxiliary memory 203, the display device 204, and the network I/F 207 achieves/achieve the function of outputting one or both of the result of the optimal power flow and the plan for operation of the output unit 304.

Figure 8:
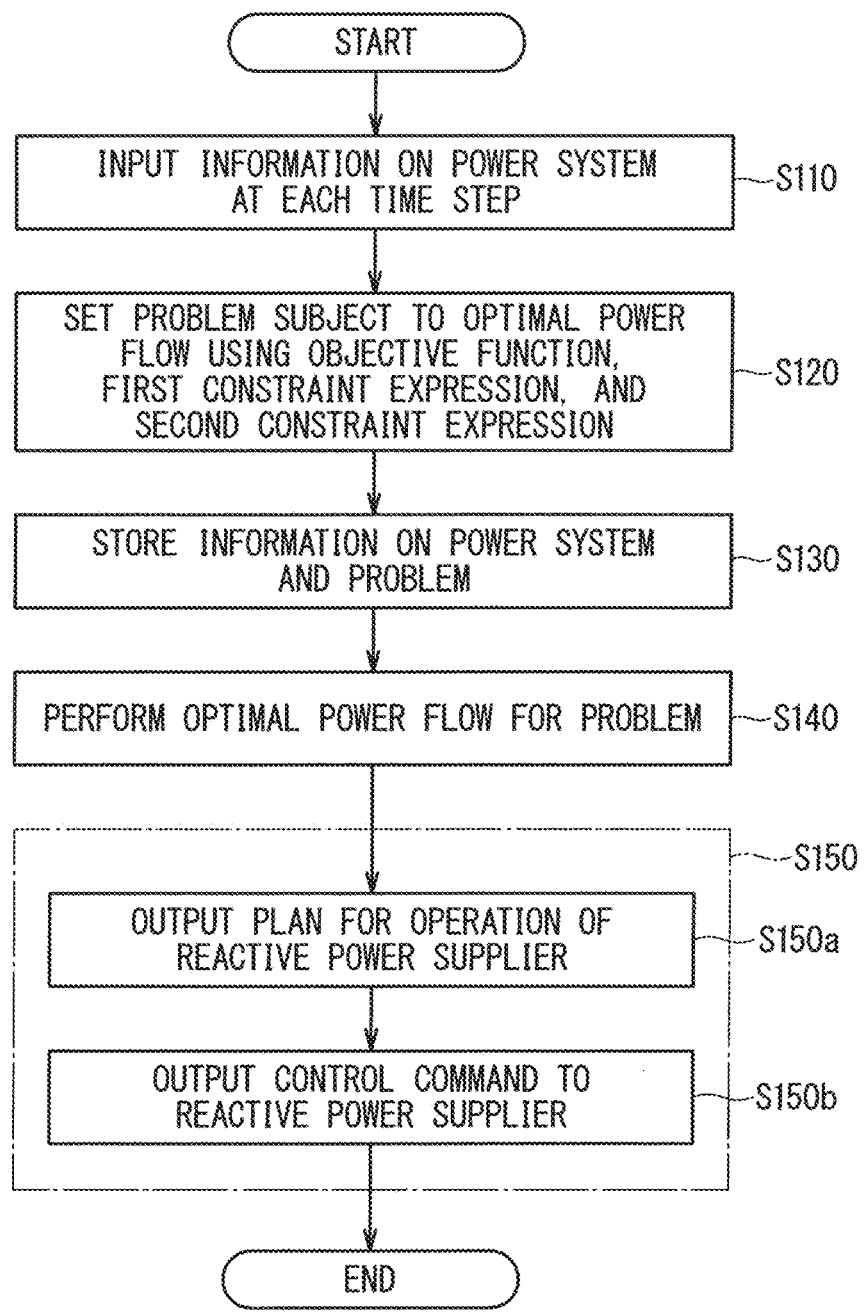
FIG. 8 is a flowchart showing operation of the control device.

FIG. 8 is a flowchart showing operation of the control device 200. The flowchart shows procedures for developing a single plan for operation of the reactive power supplier 107 and creating the control command 306 corresponding to the plan for operation.

Step S110 is a step of inputting information on the power system at each time step into the input unit 301. Specifically, in step S110, the current information 310, the pieces of future information 311 to 31n, and the power installation information 320 are input into the input unit 301.

When the function of the input unit 301 is achieved by one or more of the input device 205, the auxiliary memory 203, and the network I/F 207, step S110 is performed by the one or more of the input device 205, the auxiliary memory 203, and the network I/F 207.

Step S120 is a step of setting the problem subject to the optimal power flow (i.e., optimal power flow problem) using the objective function, the first constraint expression, and the second constraint expression.

Figure 9:
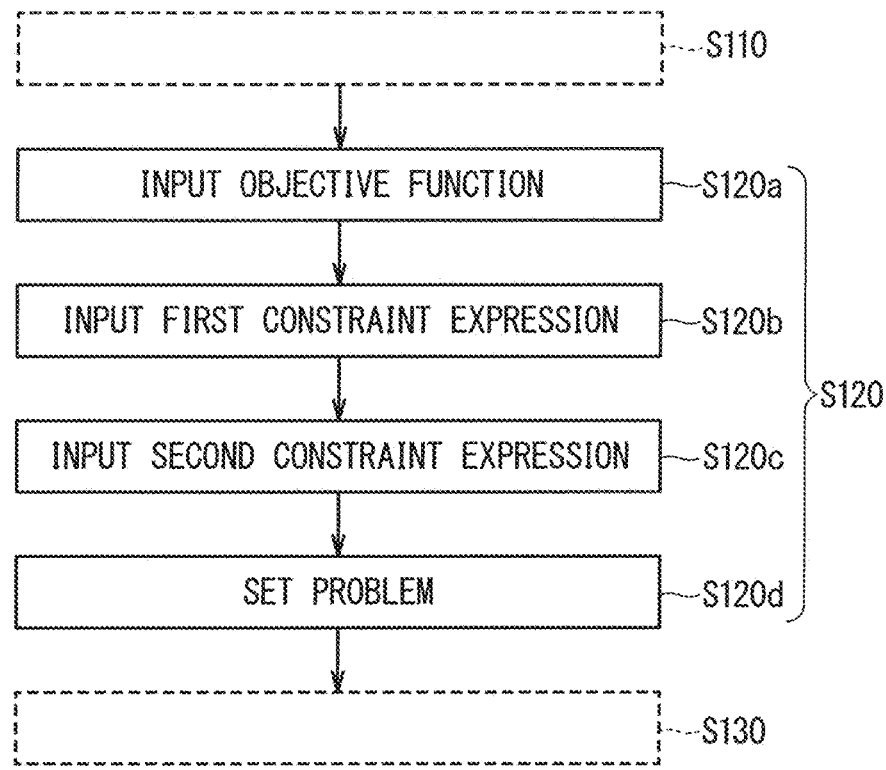
FIG. 9 is a flowchart showing details of one step of operation of the control device.

FIG. 9 is a flowchart showing details of step S120. Step S120 includes steps S120a, S120b, S120c, and S120d. In steps S120a, S120b, and S120c, the setting information 330 is input into the setting unit 302. In step S120a, the information 330a is input into the setting unit 302. In step S120b, the information 330b is input into the setting unit 302. In step S120c, the information 330c is input into the setting unit 302. In step S120d, the objective function indicated by the information 330a, the first constraint expression indicated by the information 330b, and the second constraint expression indicated by the information 330c are combined into a simultaneous form to set the optimal power flow problem.

FIG. 9 shows an example in which steps S120a, S120b, and S120c are performed in this order using arrows. Steps S120a, S120b, and S120c may be performed in any order, and may be performed in parallel.

In view of formulation of the optimal power flow problem by the objective function indicated by the information 330a, the first constraint expression indicated by the information 330b, and the second constraint expression indicated by the information 330c, it can be said that step S120d is step automatically completed by the setting unit 302 by completion of all steps S120a, S120b, and S120c.

When the function of the setting unit 302 is achieved by one or more of the input device 205, the auxiliary memory 203, and the network I/F 207, step S120 is performed by the one or more of the input device 205, the auxiliary memory 203, and the network I/F 207.

FIG. 8 shows an example in which step S120 is performed after step S110 is performed using an arrow. Steps S110 and S120 may be performed in parallel, or step S120 may be performed prior to step S110.

Step S130 is a step of storing the information on the power system and the optimal power flow problem (simply abbreviated to "PROBLEM" in FIG. 8) in the storage unit 305. Step S130 is performed after completion of steps S110 and S120. Specifically, the information input into the input unit 301 in step S110 and the setting information 330 are stored in the storage unit 305 in step S130.

A step of storing the information input into the input unit 301 in the storage unit 305 in step S130 may be performed in parallel with step S120 after completion of step S110.

A step of storing the setting information 330 in the storage unit 305 in step S130 may be performed in parallel with step S110 after completion of step S120.

When the function of the storage unit 305 is achieved by one or both of the main memory 202 and the auxiliary memory 203, step S130 is performed by the one or both of the main memory 202 and the auxiliary memory 203.

Step S140 is a step of performing the optimal power flow for the optimal power flow problem (simply abbreviated to "PROBLEM" in FIG. 8). Step S140 is performed after completion of step S130. Specifically, the information input into the input unit 301 and the setting information 330 are provided from the storage unit 305 to the calculation unit 303 in step S140. The calculation unit 303 performs the optimal power flow by using the information input into the input unit 301 as a parameter given as a fixed value in the optimal power flow problem formulated by the setting information 330. Step S140 is performed by the CPU 201.

The optimal solutions of the variables $x_k$, $u_k$, and $z_k$ in the optimal power flow problem are determined by the optimal power flow. From among the optimal solutions, the control variable $u_k$ includes the reactive power $Q(T_k)$ of the reactive power supplier 107. The reactive power $Q(T_k)$ is arranged in time order to be the plan for operation of the reactive power supplier 107. One or both of the optimal solutions and the plan for operation is/are stored in the storage unit 305, for example.

Step S150 is a step of outputting a result of the optimal power flow. Step S150 is performed after completion of step S140. Step S150 includes steps S150a and S150b.

Step S150a is a step of outputting the plan for operation of the reactive power supplier 107. Specifically, the output unit 304 outputs the plan for operation in step S150a. For example, the plan for operation is output from one or more of the auxiliary memory 203, the display device 204, and the network I/F 207.

Step S150b is a step of outputting the control command 306 to the reactive power supplier 107. Specifically, the output unit 304 outputs the control command 306 in step S150b. For example, the control command 306 is output from one or more of the control command device 206, the auxiliary memory 203, and the network I/F 207.

Processing in steps S110 to S150 shown in the flowchart of FIG. 8 is performed for each calculation period while the information on the current step $S_0$ and the future step $S_k$ is updated. The plan for operation is updated for each calculation period. The control command 306 is created based on the latest plan for operation, and is output to the reactive power supplier 107. The calculation period is set to any period, for example. The calculation period may be changed during operation of the control device 200.

[Example of Numerical Calculation]

Numerical calculation when an equation n=4 holds in the power system 100 shown in FIG. 2 is shown. A case where a multi-objective optimization problem is subject to the optimal power flow will be shown below. Specifically, minimization of the total amount of the reactive power variation amount of the reactive power supplier 107 and minimization of the total amount of variation of a voltage (hereinafter referred to as a "load voltage") V at the load 106 are objectives.

To obtain the above-mentioned effect produced by operation of the control device 200, the objective function is expressed by an equation (25) using variables over a plurality of, herein, four future steps $S_1$ to $S_4$. The objective function is hereinafter also provisionally referred to as a "proposal objective function".

$$f([u]) = \Sigma(K_Q(Q(T_k)-Q(T_{k-1}))^2) + \Sigma(K_V(V(T_k)-V(T_{k-1}))^2) \quad (25)$$

In the equation (25), the symbol $\Sigma$ indicates the sum of 1 to 4 for the integer k. A set of variables [u] includes the control variable $u_k$, and the control variable $u_k$ includes the reactive power $Q(T_k)$ and the load voltage $V(T_k)$ (k=1 to 4). Variations of the load voltage $(T_k)$ from the current step $S_0$ to the future step $S_4$ are accumulated in the equation (25). The reactive power $Q(T_0)$ and the load voltage $V(T_0)$ at the current step $S_0$ are used as parameters. Positive weight factors $K_Q$ and $K_V$ are introduced into the equation (25).

A case where the optimal power flow is performed a plurality of times at each of the future steps $S_1$, $S_2$, $S_3$, and $S_4$ is shown for comparison with the above-mentioned operation of the control device 200. The objective function for comparison (hereinafter also provisionally referred to as a "comparison objective function") is set by variables at adjacent two time steps. Specifically, the comparison objective function is expressed by an equation (26) for each integer k, and a total of four objective functions are set.

$$f([u]) = K_Q(Q(T_k)-Q(T_{k-1}))^2 + K_V(V(T_k)-V(T_{k-1}))^2 \quad (26)$$

Figure 10:
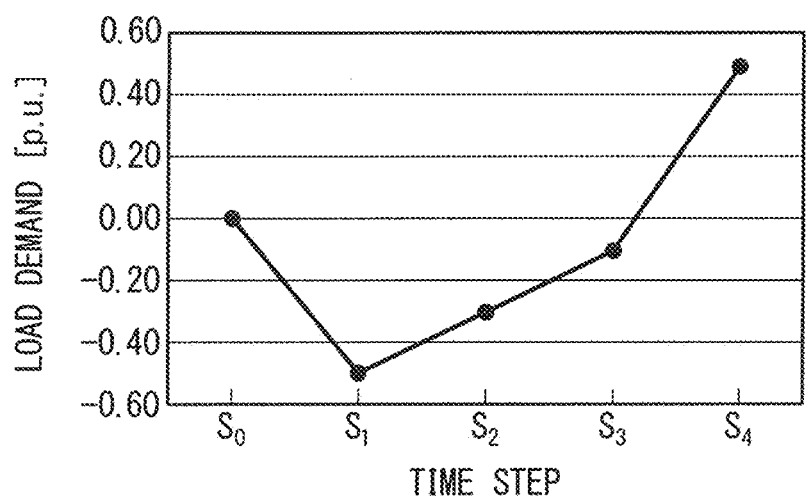
FIG. 10 is a graph showing variation of load demand at a load at time steps.

FIG. 10 is a graph showing variation of load demand $P(T_k)$ at the load 106($T_k$) in FIG. 2 at time steps. The load demand $P(T_k)$ is a predicted value, and is included in the k-th time information 31k as the information 31kd. The load demand $P(T_k)$ is expressed by an increase and a decrease from load demand $P(T_0)$ at the current step $S_0$ as a reference (zero). Variation of the load demand $P(T_k)$ greatly decreasing at the first time $T_1$ from that at the current time $T_0$, and then increasing is shown.

Figure 11:
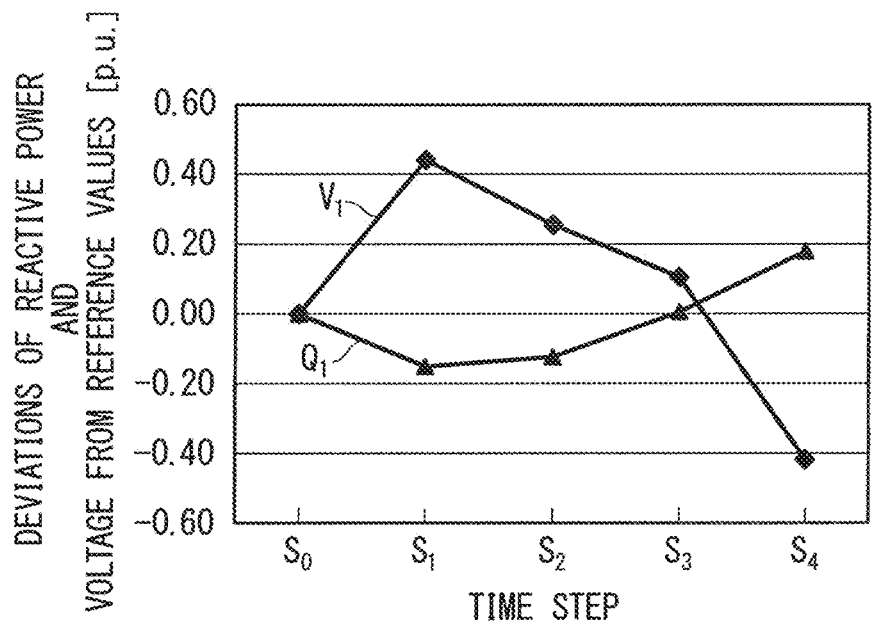
FIG. 11 is a graph showing reactive power of a reactive power supplier and a voltage at the load determined by optimal power flow.
Figure 12:
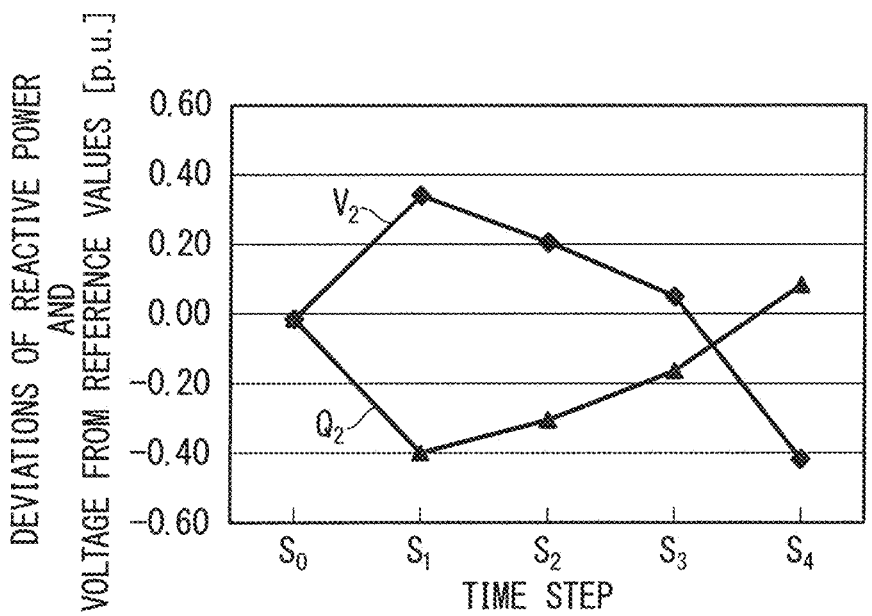
FIG. 12 is a graph showing the reactive power of the reactive power supplier and the voltage at the load determined by the optimal power flow.

FIGS. 11 and 12 are each a graph showing the reactive power $Q(T_k)$ of the reactive power supplier and the load voltage $V(T_k)$ determined by the optimal power flow over the time steps $S_0$ to $S_4$. The reactive power $Q(T_0)$ at the current step $S_0$ is zero. The load voltage $V(T_k)$ is expressed as a deviation from the load voltage $V(T_0)$ at the current step $S_0$ (the deviation from the load voltage $V(T_0)$) as a reference.

FIG. 11 is a graph obtained from a result of the optimal power flow using the proposal objective function. A polygonal line $Q_1$ represents the reactive power $Q(T_k)$. A polygonal line $V_1$ represents the load voltage $V(T_k)$.

FIG. 12 shows a graph obtained from a result of the optimal power flow using the comparison objective function at each time step. A polygonal line $Q_2$ represents the reactive power $Q(T_k)$. A polygonal line $V_2$ represents the load voltage $V(T_k)$.

FIG. 13 shows transition of a value of the reactive power $Q(T_k)$. In FIG. 13, a column indicating numerical values of the reactive power $Q(T_k)$ determined by the optimal power flow using the comparison objective function is marked with a "SINGLE-STEP", and a column indicating numerical values of the reactive power $Q(T_k)$ determined by the optimal power flow using the proposal objective function is marked with a "MULTI-STEP".

It can be said that FIGS. 11 and 12 each show the plan for operation of the reactive power supplier 107. Referring to FIG. 12, in the plan for operation obtained based on the comparison objective function (hereinafter provisionally referred to as a "comparison plan for operation"), the reactive power $Q(T_1)$ at the first step $S_1$ is greatly reduced to make an increase in voltage due to large reduction in load demand at the first step $S_1$ proper. In the comparison plan for operation, reactive power $Q(T_2)$, reactive power $Q(T_3)$, and reactive power $Q(T_4)$ are increased to make reduction in voltage due to an increase in load demand proper.

Referring to FIG. 11, the plan for operation obtained based on the proposal objective function (hereinafter provisionally referred to as a "proposal plan for operation") is developed in view of variation of the load demand at any of the first step $S_1$ to the fourth step $S_4$. The amount of reduction in reactive power $Q(T_1)$ of the reactive power supplier 107 shown in FIG. 11 is smaller than the amount of reduction in reactive power $Q(T_1)$ of the reactive power supplier 107 shown in FIG. 12. An increase in reactive power $Q(T_2)$, reactive power $Q(T_3)$, and reactive power $Q(T_4)$ shown in FIG. 11 is smaller than an increase in reactive power $Q(T_2)$, reactive power $Q(T_3)$, and reactive power $Q(T_4)$ shown in FIG. 12.

It is understood from comparison between them that variation of the reactive power Q of the reactive power supplier 107 is reduced more in the proposal plan for operation obtained based on the proposal objective function (see the equation (25)) over three or more time steps during the operation time period than in the comparison plan for operation obtained based on the comparison objective function (see the equation (26)) set by the variables at the two adjacent time steps. Use of the proposal objective function has a greater effect of reducing variation of the input of the reactive power supplier than use of the comparison objective function.

Embodiment 2

In Embodiment 2, a functional configuration of the control device 200 is shown in the block diagram of FIG. 1, and a hardware configuration of the control device 200 is shown in the block diagram of FIG. 7.

Figure 14:
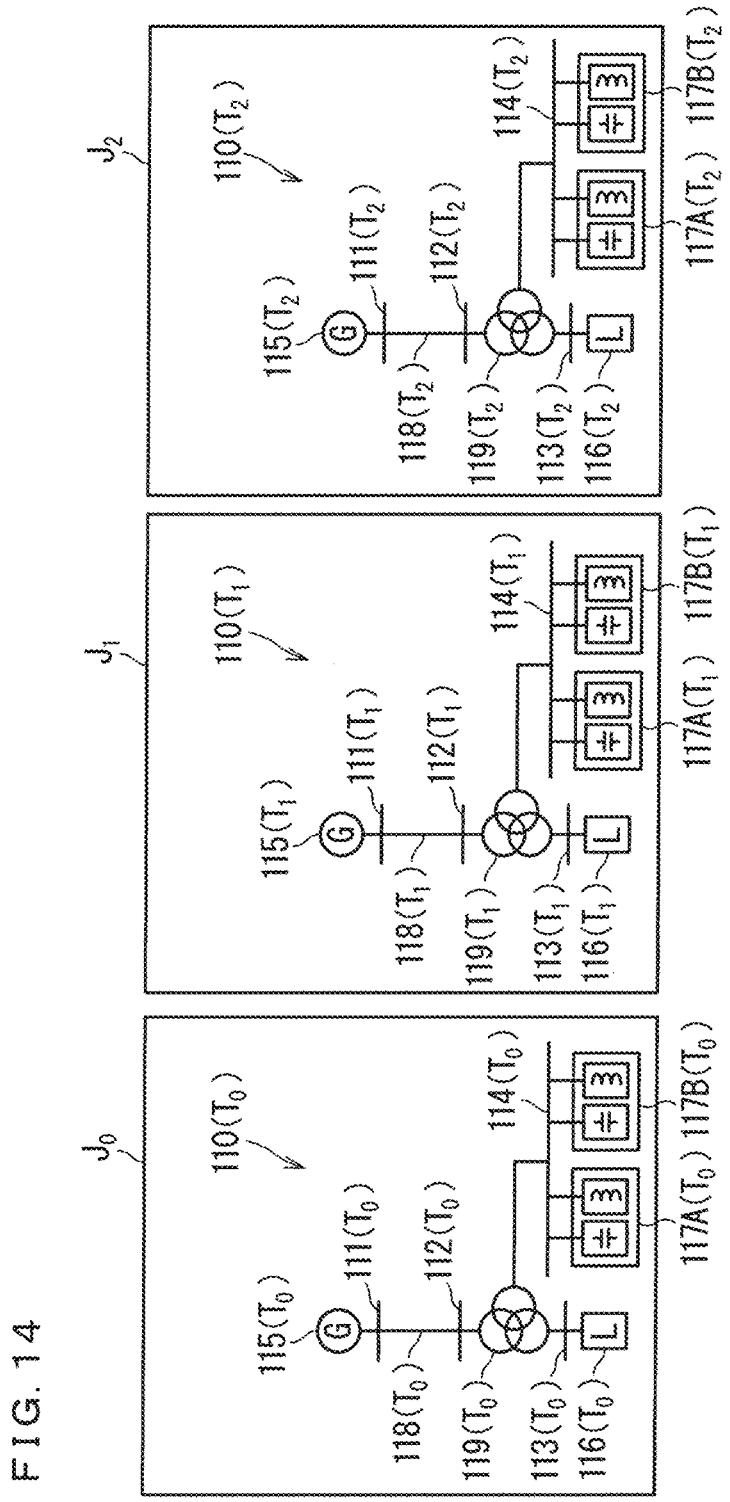
FIG. 14 is a conceptual diagram showing a time series of a plurality of time steps in Embodiment 2.

FIG. 14 is a conceptual diagram showing a time series of a plurality of time steps $J_0$, $J_1$, and $J_2$ for a power system 110 including reactive power suppliers 117A and 117B to be controlled by the control device 200. The time step $J_0$ is a current time step of the power system 110, and is hereinafter also referred to as a current step $J_0$ or a 0-th step $J_0$. The time steps $J_1$ and $J_2$ are future time steps of the power system 110, and are also referred to as future steps $J_1$ and $J_2$.

As described in Embodiment 1 with reference to FIG. 1, more future steps $J_3, \ldots J_n$ can be considered as with the future steps $J_1$ and $J_2$. The integer k represents each of integers one and two in an example below.

Description will be made on a case where the power system 110 has the same configuration from the present to the future also in Embodiment 2 for simplicity. A case where the power system 110 includes buses 111, 112, 113, and 114, a generator 115, a load 116, the reactive power suppliers 117A and 117B, a transmission line 118, and a transformer 119 will be described in Embodiment 2.

The buses 111, 112, 113, and 114, the generator 115, the load 116, the transmission line 118, and the transformer 119 are installations respectively corresponding to the buses 101, 102, 103, and 104, the generator 105, the load 106, the transmission line 108, and the transformer 109 of the power system 100 shown in Embodiment 1.

While the reactive power suppliers 117A and 117B correspond to the reactive power supplier 117 included in the power system 100, a plurality of (herein two) reactive power suppliers 117A and 117B are included in the power system 110.

The generator 115 is connected to the bus 111. The bus 111 and the bus 112 are connected via the transmission line 118. The load 116 is connected to the bus 113. The reactive power suppliers 117A and 117B are connected to the bus 114. The buses 112, 113, and 114 are connected via the transformer 119.

In FIG. 14, "$(T_0)$" has been added to the end of a reference sign of each of the power system 110, the buses 111, 112, 113, and 114, the generator 115, the load 116, the reactive power suppliers 117A and 117B, the transmission line 118, and the transformer 119 at the 0-th step $J_0$ to indicate a state thereof at the current time $T_0$.

Similarly, "$(T_k)$" has been added to the end of the reference sign of each of the power system 110, the buses 111, 112, 113, and 114, the generator 115, the load 116, the reactive power suppliers 117A and 117B, the transmission line 118, and the transformer 119 at a k-th step $J_k$ to indicate a state thereof at the future k-th time $T_k$. The k-th time $T_k$ is later than the (k−1)-th time $T_{k-1}$. The k-th step $J_k$ is a future step later than a (k−1)-th step $J_{k-1}$.

Figure 15:
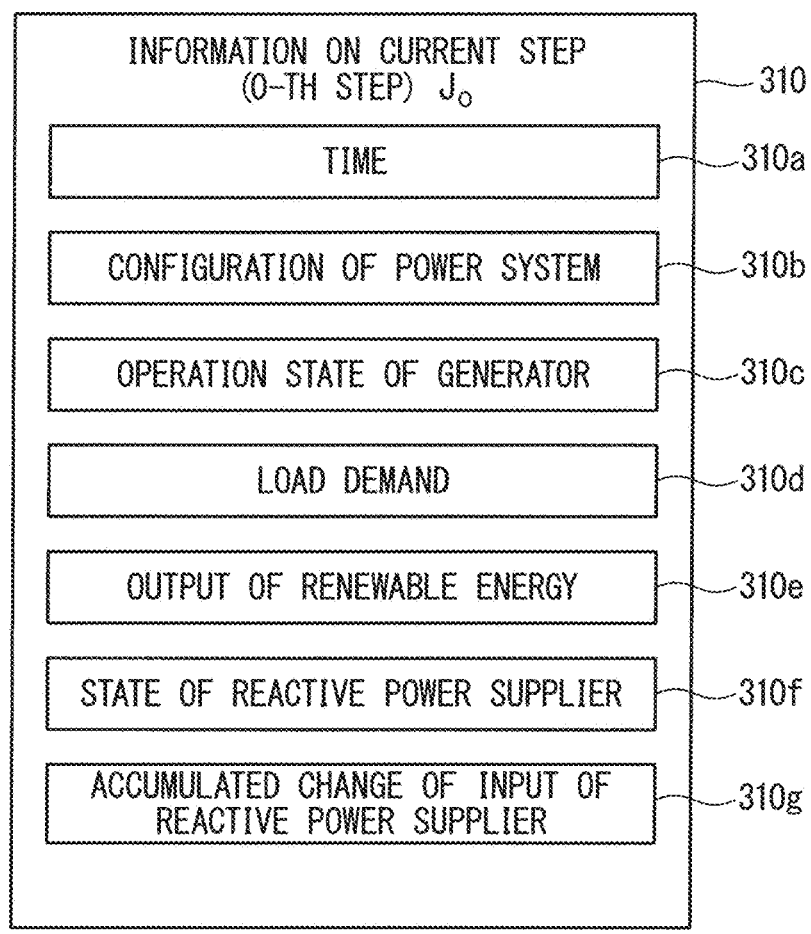
FIG. 15 is a block diagram showing content of current information in Embodiment 2.

FIG. 15 is a block diagram showing content of the current information 310 in Embodiment 2. The current information 310 is information on the current step (0-th step) $J_0$. The current information 310 includes the pieces of information 310a, 310b, 310c, 310d, 310e, and 310f and a piece of information 310g.

The information 310a in Embodiment 2 indicates the current time (specifically, the 0-th time $T_0$). The information 310b indicates a current configuration of the power system 110 (specifically, the buses 111($T_0$), 112($T_0$), 113($T_0$), and 114($T_0$), the generator 115($T_0$), the load 116($T_0$), the reactive power suppliers 117A($T_0$) and 117B($T_0$), the transmission line 118($T_0$), and the transformer 119($T_0$) of the power system 110($T_0$) and a connection relationship among them (including the connection relationship itself or an estimated connection relationship)).

The information 310c indicates a current operation state of the generator 115 (specifically, an operation state of the generator 115($T_0$) (including the operation state itself or an estimated operation state)).

The information 310d indicates a current value of the amount of power demand at the load 116 (load demand) (specifically, the load demand at the load 116($T_0$) or an estimated value thereof).

The information 310e indicates a current output of renewable energy (specifically, an output of renewable energy of the generator 115($T_0$) or an estimated value thereof).

The information 310f indicates current states of the reactive power suppliers 117A and 117E (specifically, inputs of the reactive power suppliers 117($T_0$) and 117B($T_0$) themselves or estimated states thereof).

The information 310g indicates accumulated variations of the inputs of the reactive power suppliers 117A and 117B to the current time $T_0$.

The pieces of information 310a to 310e in Embodiment 2 differ from the pieces of information 310a to 310e in Embodiment 1 in that information on the reactive power suppliers 117A and 117B is used in place of the information on the reactive power supplier 117. The current information 310 in Embodiment 2 differs from the current information 310 in Embodiment 1 in that the information 310g has been added.

The k-th time information 31k in Embodiment 2 is information on the k-th step $J_k$ of the power system 110. The k-th time information 31k in Embodiment 2 includes the pieces of information 31ka, 31kb, 31kc, 31kd, and 31ke as with the k-th time information 31k in Embodiment 1 (see FIG. 4).

The information 31ka indicates the k-th time $T_k$. The information 31kb indicates a configuration of the power system 110 at the k-th time $T_k$ (specifically, the buses 111($T_k$), 112($T_k$), 113($T_k$), and 114($T_k$), the generator 115($T_k$), the load 116($T_k$), the reactive power suppliers 117($T_k$) and 117B($T_k$), the transmission line 118($T_k$), and the transformer 119($T_k$) of the power system 110($T_k$) and a connection relationship among them).

The information 31kc indicates a schedule for the operation state of the generator 115 at the k-th time $T_k$ (an operation plan: specifically, a plan for operation of the generator 115($T_k$)).

The information 31kd indicates the predicted value of the load demand at the k-th time $T_k$ (specifically, a predicted value of the load demand at the load 116($T_k$)).

The information 31ke indicates the schedule for the output of renewable energy at the k-th time $T_k$ (specifically, the operation plan or the predicted value of the output of renewable energy of the generator 115($T_k$)).

The power installation information 320 in Embodiment 2 includes the pieces of information 320a, 320b, 320c, 320d, and 320e as with the power installation information 320 Embodiment 1 (see FIG. 5).

The information 320a indicates upper and lower limits of reactive power $Q_A$ output from the reactive power supplier 117A and reactive power $Q_B$ output from the reactive power supplier 117B. The information 320b indicates upper and lower limits of power output from the generator 115. The information 320c indicates upper and lower limits of a bus voltage at the buses 111 to 114. The information 320d indicates a capacity of the transmission line 118. The information 320e indicates upper and lower limits of tap control of the transformer 119.

The power system 110 in Embodiment 2 includes the reactive power suppliers 117A and 117B in place of the reactive power supplier 107 of the power system 100 in Embodiment 1. In Embodiment 2, the reactive power supplier variation amounts of the reactive power suppliers 117A and 117B are reduced. In Embodiment 2, a difference (hereinafter referred to as a "total amount difference") between the total reactive power supplier variation amount of the reactive power supplier 117A and the total reactive power supplier variation amount of the reactive power supplier 117B is reduced. Reduction in total amount difference reduces imbalance between respective variations of the inputs of the reactive power suppliers to thereby reduce imbalance of the progress of degradation between the reactive power suppliers.

In Embodiment 2, the objective function, the first constraint expression, and the second constraint expression set constraints imposed on operation of the power system 110. In Embodiment 2, at least one of the objective function and the second constraint expression is set to reduce the total amount of the reactive power supplier variation amount of the reactive power supplier 117A, the total amount of the reactive power supplier variation amount of the reactive power supplier 117B, and the total amount difference between the reactive power suppliers 117A and 117B. In Embodiment 2, the optimal power flow is formulated to include at least one of the objective function and the second constraint expression to reduce the total reactive power variation amount of the reactive power supplier 117A (this is the amount of variation of the reactive power $Q_A$ output from the reactive power supplier 117A), the total reactive power variation amount of the reactive power supplier 117B (this is the amount of variation of the reactive power $Q_B$ output from the reactive power supplier 117B), and the total amount difference.

In Embodiment 2, the objective function is shown in equations (27), (28), and (29), for example. The equations (28) and (29) respectively indicate weight factors $K_{\Delta QA}$ and $K_{\Delta QB}$ used in the equation (27). The total amounts $\Delta Q_{Asum}$ and $\Delta Q_{Bsum}$ are respectively introduced in the equations (28) and (29).

$$f(u_1;u_2)=K_{\Delta QA}\times((Q_A(T_2)-Q_A(T_1))^2+(Q_A(T_1)-Q_A(T_0))^2)+K_{\Delta QB}\times((Q_B(T_2)-Q_B(T_1))^2+(Q_B(T_1)-Q_B(T_0))^2) \quad (27)$$

$$K_{\Delta QA}=\Delta Q_{Asum}/(\Delta Q_{Asum}+\Delta Q_{Bsum}) \quad (28)$$

$$K_{\Delta QB}=\Delta Q_{Bsum}/(\Delta Q_{Asum}+\Delta Q_{Bsum}) \quad (29)$$

The total amount $\Delta Q_{Asum}$ indicates a result of accumulated variations of the input of the reactive power supplier 117A generated due to operation of the power system 110 to the current time $T_0$. The total amount $\Delta Q_{Bsum}$ indicates a result of accumulated variations of the input of the reactive power supplier 117B generated due to operation of the power system 110 to the current time $T_0$. The total amounts $\Delta Q_{Asum}$ and $\Delta Q_{Bsum}$ are parameters in the optimal power flow indicated by the information 310g.

Another example of the objective function in Embodiment 2 is shown in equations (30), (31), and (32). The total amount of variation of the reactive power $Q_A$, the total amount of variation of the reactive power $Q_B$, and variance $V_{\Delta Q}$ are reduced by the optimal power flow to minimize the objective function.

$$f(u_1;u_2)=K_A\times((Q_A)(T_2)-Q_A(T_1))^2+(Q_A(T_1)-Q_A(T_0))^2+(Q_B(T_2)-Q_B(T_1))^2+(Q_B(T_1)-Q_B(T_0))^2)+K_B\times V_{\Delta Q} \quad (30)$$

$$V_{\Delta Q}=((|Q_A(T_2)-Q_A(T_1)|+|Q_A(T_1)-Q_A(T_0)|+\Delta Q_{Asum}-\Delta Q_{ave})^2+(|Q_B(T_2)-Q_B(T_1)|+|Q_B(T_1)-Q_B(T_0)|+\Delta Q_{Bsum}-\Delta Q_{ave})^2)/2 \quad (31)$$

$$\Delta Q_{ave}=((|Q_A(T_2)-Q_A(T_1)|+|Q_A(T_1)-Q_A(T_0)|+\Delta Q_{Asum})+(|Q_B(T_2)-Q_B(T_1)|+|Q_B(T_1)-Q_B(T_0)|+\Delta Q_{Bsum}))/2 \quad (32)$$

The variance $V_{\Delta Q}$ and an average value $\Delta Q_{ave}$ are shown in the equation (30). Positive weight factors $K_A$ and $K_B$ are introduced in the equation (30). The variance $V_{\Delta Q}$ shown in the equation (31) indicates variance of accumulated values of variations of the inputs of the reactive power suppliers 117A and 117B generated due to operation of the power system 110 to the second time $T_2$. The average value $\Delta Q_{ave}$ shown in the equation (32) indicates the average of the accumulated values.

It can be said that the variance $V_{\Delta Q}$ is variance of the result of accumulated variations of the input of the reactive power supplier 117A at the current step $J_0$ and the future steps $J_1$ and $J_2$ and the result of accumulated variations of the input of the reactive power supplier 117B at the current step $J_0$ and the future steps $J_1$ and $J_2$.

Reduction in variance $V_{\Delta Q}$ reduces imbalance between respective variations of the inputs of the reactive power suppliers 117A and 117B to thereby reduce imbalance of the progress of degradation between the reactive power suppliers 117A and 117B.

The variance $V_{\Delta Q}$ is reduced, for example, by using the second constraint expression expressed by an inequality (33) in addition to the equations (30), (31), and (32). An upper limit $V_{\Delta max}$ is introduced in the inequality (33). In this case, the weight factor $K_B$ may be zero in the equation (30).

$$h_B(u_1;u_2)=V_{\Delta Q}-V_{\Delta Qmax}\leq 0 \quad (33)$$

The reactive power variation amounts of the reactive power suppliers 117A and 117B are reduced by using the second constraint expression expressed by equations (34A) and an inequality (34B) as in a case where the second constraint expression expressed by the equation (22A) and the inequality (22B) is used. In the inequality (34B), an equation k=1, 2 holds. In the inequality (34B), the symbol E indicates the sum of 1 and 2 for the integer k. In the inequality (34B), the upper limit $\Delta Q_{max}$ is used for a total sum of the reactive power variation amounts of the reactive power suppliers 117A and 117B from the current step $J_0$ to the second step $J_2$.

$$g_{CA}(u_1;u_2)=Q_A(T_2)-Q_A(T_1)=0,$$

$$g_{CB}(u_1;u_2)=Q_B(T_2)-Q_B(T_1)=0 \quad (34A)$$

$$h_B(u_1;u_2)=\Sigma(|Q_A(T_k)-Q_A(T_{k-1})|+|Q_B(T_k)-Q_B(T_{k-1})|)-\Delta Q_{max} \leq 0 \quad (34B)$$

Operation of the control device 200 in Embodiment 2 is shown in the flowchart shown in FIG. 8. In Embodiment 2, the control variable $u_k$ whose optimal solution is determined by the optimal power flow in step S140 includes reactive power $Q_A(T_k)$ of the reactive power supplier 117A and reactive power $Q_B(T_k)$ of the reactive power supplier 117B (k=1, 2). The reactive power $Q_A(T_k)$ and reactive power $Q_B(T_k)$ are arranged in time order to be the plan for operation of the reactive power suppliers 117A and 117B. One or both of the optimal solution and the plan for operation is/are stored in the storage unit 305, for example. The control command 306 is created based on the latest plan for operation, and is output to the reactive power suppliers 117A and 117B.

Description on the other operation of the control device 200 in Embodiment 2, to which description of the other operation of the control device 200 in Embodiment 1 applies, is omitted.

In Embodiment 2, processing in steps S110 to S150 shown in the flowchart of FIG. 8 is performed for each calculation period while the information on the current step $J_0$ and the future step $J_k$ is updated as in Embodiment 1. The plan for operation is updated for each calculation period. The calculation period is set to any period, for example. The calculation period may be updated during operation of the control device 200.

In Embodiment 2, the number of future steps to be considered may be expanded to three or more as in Embodiment 1. Even when the number of reactive power suppliers included in the power system 110 is three or more in Embodiment 2, the optimal power flow is formulated by expanding the equations (27) to (32) and the inequality (33) described above.

The plan for operation and, further, the control command 306 obtained by formulation and optimal power flow as described above contribute to suppression of the total amount of variations of the inputs of the reactive power suppliers 117A and 117B and reduction in imbalance of the lifetime between the reactive power suppliers 117A and 117B while meeting a constraint on operation of the power system 110. Reduction in imbalance of the lifetime between the reactive power suppliers 117A and 117B contributes to efficient operation of the reactive power suppliers 117A and 117B.

Description on Embodiments 1 and 2 will be made below, for example. In description made below, a symbol ";" is used to divide a reference sign used in Embodiment 1 and a reference sign used in Embodiment 2. A reference sign before the symbol ";" is the reference sign used in Embodiment 1. A reference sign after the symbol ";" is the reference sign used in Embodiment 2.

The control device 200 controls the reactive power supplier(s) 117;117A and 117B included in the power system 100;110. The control device 200 includes the output unit 304, the storage unit 305, and the calculation unit 303.

The output unit 304 outputs the control command 306 being a command to control the reactive power supplier(s) 117;117A and 117B included in the power system 100;110. The storage unit 305 stores the current information 310, the plurality of pieces of future information 311 to 31n, the power installation information 320, the objective function (any of the expressions (6) and (15) and the equations (13), (21), (23), and (25) in Embodiment 1 and any of the equations (27) and (30) in Embodiment 2), and the plurality of constraint expressions (including any of the equations (11), (12), (14A), (19), and (22A) and the inequalities (14B), (20), (22B), and (24) in Embodiment 1 and including any of the equation (34A) and the inequalities (33) and (34B) in Embodiment 2). The calculation unit 303 performs the optimal power flow for the optimal power flow problem.

When the configuration is viewed as a reactive power supplier control method, the control method includes steps of: outputting the control command 306 being the command to control the reactive power supplier(s) 117;117A and 117B included in the power system 100;110 from the output unit 304; storing the current information 310, the pieces of future information 311 to 31n, the power installation information 320, the objective function (any of the expressions (6) and (15) and the equations (13), (21), (23), and (25) in Embodiment 1 and any of the equations (27) and (30) in Embodiment 2), and the plurality of constraint expressions (including any of the equations (11), (12), (14A), (19), and (22A) and the inequalities (14B), (20), (22B), and (24) in Embodiment 1 and including any of the equation (34A) and the inequalities (33) and (34B) in Embodiment 2) in the storage unit 305; and performing the optimal power flow for the optimal power flow problem using the calculation unit 303.

The current information 310 is information on the current step $S_0;J_0$ being the current time step for the power system 100;110. The plurality of pieces of future information 311 to 31n (future information 31k) are a plurality of pieces of information on the plurality of respective future steps $S_1$ to $S_n;J_1$ to $J_n$ ($S_k;J_k$) being the plurality of future time steps for the power system 100;110. The power installation information 320 is information on the installations constituting the power system 100;110.

The optimal power flow problem is a problem subject to the optimal power flow for the power system 100;110. The optimal power flow problem is formulated by the objective function and the plurality of constraint expressions based on the current information 310, the plurality of pieces of future information 311 to 31n, and the power installation information 320.

The calculation unit 303 performs the optimal power flow to determine the variable u for the objective function. The control command 306 is set based on the variable u determined by the optimal power flow.

In at least one of the objective function and the plurality of constraint expressions, the amounts of variation of the input(s) of the reactive power supplier(s) 107;117A and 117B at the current step $S_0;J_0$ and the plurality of future steps $S_1$ to $S_n;J_1$ to $J_n$ of the reactive power supplier(s) 107;117A and 117B are accumulated.

The control device 200 having such a configuration performs control to reduce variation(s) of the input(s) of the reactive power supplier(s) 107;117A and 117B.

For example, in the objective function, the amounts of variation of the reactive power $Q;Q_A$ and $Q_B$ output from the reactive power supplier(s) 107;117A and 117B at the current step $S_0;J_0$ and the plurality of future steps $S_1$ to $S_n;J_1$ to $J_n$ of the reactive power supplier(s) 107;117A and 117B are accumulated. According to Embodiment 1, the objective function is shown by the equations (13), (21), (23), and (25). According to Embodiment 2, the objective function is shown by the equations (27) and (30). The variable u to minimize the objective function is determined by the optimal power flow.

Variation of the reactive power $Q;Q_A$ and $Q_B$ output from the reactive power supplier(s) 107;117A and 117B is reduced by using such an objective function. Reduction in variation of the reactive power $Q;Q_A$ and $Q_B$ contributes to reduction in variation of the input(s) of the reactive power supplier(s) 107;117A and 117B.

At least one of the functions used in the plurality of constraint expressions sets an upper limit of an accumulation of amounts of variation of the reactive power $Q;Q_A$ and $Q_B$ output from the reactive power supplier(s) 107;117A and 117B at the current step $S_0;J_0$ and the plurality of future steps $S_1$ to $S_n;J_1$ to $J_n$ of the reactive power supplier(s) 107;117A and 117B. According to Embodiment 1, such a constraint expression is shown by the inequalities (14B), (22B), and (24). According to Embodiment 2, the constraint expression is shown by the inequality (34B).

Variation of the reactive power $Q;Q_A$ and $Q_B$ output from the reactive power supplier(s) 107;117A and 117B is reduced by using such a constraint expression. Reduction in variation of the reactive power $Q;Q_A$ and $Q_B$ contributes to reduction in variation of the input(s) of the reactive power supplier(s) 107;117A and 117B.

Referring to the equation (23), in the accumulation of the amounts of variation of the reactive power Q (reactive power variation amount), the reactive power variation amounts $(Q(T_k)-Q(T_{k-1}))^2$ are each multiplied by the positive weight factor $K_k$. The weight factor $K_k$ is set to be smaller as the future step $S_k$ corresponding to the weight factor $K_k$ is farther from the current step $S_0$.

Use of such a weight factor contributes to the optimal power flow reflecting accuracy of prediction. Such a weight factor can be also used in Embodiment 2.

At least one of the functions used in the plurality of constraint expressions sets a value of the amount of variation of the reactive power $Q;Q_A$ and $Q_B$ output from the reactive power supplier(s) 107;117A and 117B between the time steps. According to Embodiment 1, such a constraint expression is shown by the equations (14A) and (22A). According to Embodiment 2, the constraint expression is shown by the equation (34A).

Variation of the reactive power $Q;Q_A$ and $Q_B$ output from the reactive power supplier(s) 107;117A and 117B is reduced by using such a constraint expression. Reduction in variation of the reactive power $Q;Q_A$ and $Q_B$ contributes to reduction in variation of the input(s) of the reactive power supplier(s) 107;117A and 117B.

The power system 100;110 includes the load 106;116. In the objective function (expressed by the equation (25) according to Embodiment 1), variations of the voltage (load voltage) V at the load 106;116 at the current step $S_0;J_0$ and the plurality of future steps $S_1$ to $S_n;J_1$ to $J_n$ are accumulated. The variable u to minimize the objective function is determined by the optimal power flow.

Use of such an objective function contributes to reduction in variation of the load voltage. Such an objective function can be also used in Embodiment 2.

When the plurality of reactive power suppliers 117A and 117B are included in the power system 110, in at least one of the objective function and the plurality of constraint expressions, the variance $V_{\Delta Q}$ of the result of accumulated variations of the input of the reactive power supplier 117A at the current step $J_0$ and the plurality of future steps $J_1$ and $J_2$ and the result of accumulated variations of the input of the reactive power supplier 117B at the current step $J_0$ and the plurality of future steps $J_1$ and $J_2$ is used.

Reduction in variance $V_{\Delta Q}$ reduces imbalance between respective variations of the inputs of the reactive power suppliers 117A and 117B to thereby reduce imbalance of the progress of degradation between the reactive power suppliers 117A and 117B.

The variance $V_{\Delta Q}$ is used in the objective function as shown in the equations (30), (31), and (32), for example. The variable u to minimize the objective function is determined by the optimal power flow.

At least one of the constraint expressions sets a value of the variance $V_{\Delta Q}$ as shown in the inequality (33), for example.

Embodiments can freely be combined with each other, and can be modified or omitted as appropriate. For example, in Embodiment 2, accumulated variations of the load voltage V at the load 116 may be included in the objective function f([u]) as in an example of numerical calculation introduced in Embodiment 1.

The weight factor $K_A$ may be zero in Embodiment 2, for example. In this case, the control variable $u_k$ to minimize the variance $V_{\Delta Q}$ is determined by the optimal power flow to minimize the objective function. The inequality (33) may not be used in this case. Alternatively, another objective function is used, and the inequality (33) is used in Embodiment 2, for example.

Use of the variance $V_{\Delta Q}$ in at least one of the objective function (the equation (30) in the above-mentioned example) and the plurality of constraint expressions (the inequality (33) in the above-mentioned example) reduces imbalance of the progress of degradation between the reactive power suppliers 117A and 117B regardless of reduction in reactive power supplier variation amounts of each of the reactive power suppliers 117A and 117B.

While the present disclosure has been described in detail, the foregoing description is in all aspects illustrative and not restrictive. It is understood that numerous unillustrated modifications can be devised.

EXPLANATION OF REFERENCE SIGNS

100, 110 power system, 106, 116 load, 107, 117A, 117B reactive power supplier, 200 control device, 303 calculation unit, 304 output unit, 305 storage unit, 306 control command, 310 current information, 311 to 31$n$ future information, 320 power installation information, f objective function, $h_B$, $g_C$, $g_{Ck}$ function, $J_1$, $J_2$, $S_1$ to $S_n$ future step, $K_k$ weight factor, Q reactive power, $S_0$, $J_0$ current step, V load voltage.

The invention claimed is:

1. A reactive power supplier control device comprising:
    an output unit to output a control command being a command to control a reactive power supplier included in a power system;
    a storage unit to store current information, a plurality of pieces of future information, power installation information, an objective function, and a plurality of constraint expressions; and
    a calculation unit to perform optimal power flow for an optimal power flow problem, wherein
    the current information is information on a current step being a current time step for the power system,
    the plurality of pieces of future information are a plurality of pieces of information on a plurality of respective future steps being a plurality of future time steps for the power system, the power installation information is information on installations constituting the power system, the optimal power flow problem is a problem subject to the optimal power flow for the power system, the optimal power flow problem is formulated by the objective function and the plurality of constraint expressions based on the current information, the plurality of pieces of future information, and the power installation information, the calculation unit performs the optimal power flow to determine a variable for the objective function, the control command is set based on the variable determined by the optimal power flow, and in at least one of the objective function and the plurality of constraint expressions, amounts of variation of an input of the reactive power supplier at the current step and the plurality of future steps of the reactive power supplier are accumulated.

2. The reactive power supplier control device according to claim 1, wherein in the objective function, amounts of variation of reactive power output from the reactive power supplier at the current step and the plurality of future steps of the reactive power supplier are accumulated, and the variable to minimize the objective function is determined by the optimal power flow.

3. The reactive power supplier control device according to claim 1, wherein at least one of functions used in the plurality of constraint expressions sets an upper limit of an accumulation of amounts of variation of reactive power output from the reactive power supplier at the current step and the plurality of future steps of the reactive power supplier.

4. The reactive power supplier control device according to claim 2, wherein in the accumulation of the amounts of variation of the reactive power, the amounts are each accumulated by being multiplied by a positive weight factor, and the weight factor is set to be smaller as a future step corresponding to the weight factor is farther from the current step.

5. The reactive power supplier control device according to claim 1, wherein at least one of functions used in the plurality of constraint expressions sets a value of an amount of variation of reactive power output from the reactive power supplier between the time steps.

6. The reactive power supplier control device according to claim 1, wherein the power system includes a load, in the objective function, variations of a voltage at the load at the current step and the plurality of future steps are accumulated, and the variable to minimize the objective function is determined by the optimal power flow.

7. The reactive power supplier control device according to claim 1, wherein more than one of the reactive power supplier is included in the power system, and in at least one of the objective function and the plurality of constraint expressions, variance of a result of accumulated variations of an input of a first one of the reactive power supplier at the current step and the plurality of future steps and a result of accumulated variations of an input of a second one of the reactive power supplier at the current step and the plurality of future steps is used.

8. The reactive power supplier control device according to claim 7, wherein the variance is used in the objective function, and the variable to minimize the objective function is determined by the optimal power flow.

9. The reactive power supplier control device according to claim 7, wherein at least one of the plurality of constraint expressions sets a value of the variance.

10. The reactive power supplier control device according to claim 1, wherein more than one of the reactive power supplier is included in the power system, and in at least one of the objective function and the plurality of constraint expressions, a product of a result of accumulated variations of an input of a first one of the reactive power supplier at the current step and the plurality of future steps and a first weight factor and a product of a result of accumulated variations of an input of a second one of the reactive power supplier at the current step and the plurality of future steps and a second weight factor are used, and the first weight factor and the second weight factor are each set using a first value obtained by accumulating amounts of variation of the input of the first one of the reactive power supplier to the current step and a second value obtained by accumulating amounts of variation of the input of the second one of the reactive power supplier to the current step.

11. The reactive power supplier control device according to claim 10, wherein the first weight factor and the second weight factor are set to reduce a difference between the amounts of variation of the input of the first one of the reactive power supplier and the amounts of variation of the input of the second one of the reactive power supplier.

12. The reactive power supplier control device according to claim 11, wherein the first weight factor is greater than the second weight factor when the first value is greater than the second value.

13. A reactive power supplier control method comprising:

outputting a control command being a command to control a reactive power supplier included in a power system from an output unit;

storing current information, a plurality of pieces of future information, power installation information, an objective function, and a plurality of constraint expressions in a storage unit; and performing optimal power flow for an optimal power flow problem using a calculation unit, wherein the current information is information on a current step being a current time step for the power system, the plurality of pieces of future information are a plurality of pieces of information on a plurality of respective future steps being a plurality of future time steps for the power system, the power installation information is information on installations constituting the power system, the optimal power flow problem is a problem subject to the optimal power flow for the power system, the optimal power flow problem is formulated by the objective function and the plurality of constraint expressions based on the current information, the plurality of pieces of future information, and the power installation information, the calculation unit performs the optimal power flow to determine a variable for the objective function, the control command is set based on the variable determined by the optimal power flow, and in at least one of the objective function and the plurality of constraint expressions, amounts of variation of an input of the reactive power supplier at the current step and the plurality of future steps of the reactive power supplier are accumulated.

14. A reactive power supplier control method comprising:

outputting a control command being a command to control a plurality of reactive power suppliers included in a power system from an output unit;

storing current information, a plurality of pieces of future information, power installation information, an objective function, and a plurality of constraint expressions in a storage unit; and performing optimal power flow for an optimal power flow problem using a calculation unit, wherein the current information is information on a current step being a current time step for the power system, the plurality of pieces of future information are a plurality of pieces of information on a plurality of respective future steps being a plurality of future time steps for the power system, the power installation information is information on installations constituting the power system, the optimal power flow problem is a problem subject to the optimal power flow for the power system, the optimal power flow problem is formulated by the objective function and the plurality of constraint expressions based on the current information, the plurality of pieces of future information, and the power installation information, the calculation unit performs the optimal power flow to determine a variable for the objective function, the control command is set based on the variable determined by the optimal power flow, and in at least one of the objective function and the plurality of constraint expressions, variance of a result of accumulated variations of an input of a first one of the plurality of reactive power suppliers at the current step and the plurality of future steps and a result of accumulated variations of an input of a second one of the plurality of reactive power suppliers at the current step and the plurality of future steps is used.

* * * * *